United States Patent [19]
Urry et al.

[11] 3,901,921
[45] Aug. 26, 1975

[54] SYNTHESIS OF ZEARALANES AND RELATED COMPOUNDS AND INTERMEDIATES USEFUL IN THE SYNTHESES THEREOF

[75] Inventors: Wilbert Herbert Urry, Chicago, Ill.; Guy Towns Mullenbach, Berkeley, Calif.

[73] Assignee: Commercial Solvents Corporation, Terre Haute, Ind.

[22] Filed: Apr. 25, 1972

[21] Appl. No.: 247,342

[52] U.S. Cl. ..260/343.2 R; 260/343.2 F; 260/343.3; 260/514 K; 260/468 K; 260/473 S; 260/473 R; 260/526 N; 260/486 R
[51] Int. Cl. .......................... C07d 7/26; C07d 9/00
[58] Field of Search .... 260/343.2 R, 343.3, 343.2 F

[56] References Cited
UNITED STATES PATENTS
3,239,341   3/1966   Hodge et al. ................ 260/343.2 X

*Primary Examiner*—John M. Ford
*Attorney, Agent, or Firm*—Morton, Bernard, Brown, Roberts and Sutherland

[57] ABSTRACT

Compounds of the formula

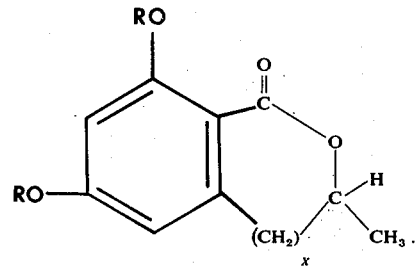

where X is an integer from 0 to 12, are synthesized employing a process involving lactone ring closure of compounds of the formula

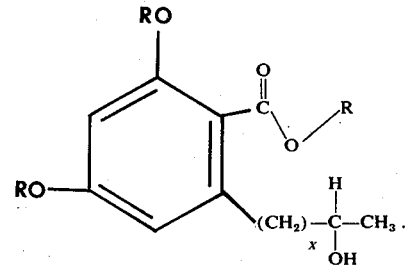

11 Claims, No Drawings

3,901,921

SYNTHESIS OF ZEARALANES AND RELATED COMPOUNDS AND INTERMEDIATES USEFUL IN THE SYNTHESES THEREOF

SUMMARY OF THE INVENTION

This invention provides a new synthesis for zearalanes and related compounds which related compounds and zearalanes are represented by the formula

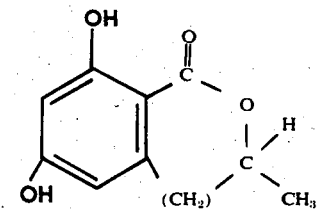

where X is an integer having a value from 0 to 12 inclusive.

The anabolic agent (R,S)-zearalane, in which X = 9 in the foregoing formula, is prepared by a total chemical synthesis involving the reaction of 10-undecen-1-ol with p-toluenesulfonyl chloride to prepare 10-undecen-1-yl p-toluenesulfonate; treating the foregoing sulfonate with sodium bromide to yield 1-bromo-10-undecylene; subjecting the bromo compound to a Grignard reaction with triethyl orthoformate to form 11-dodecenal; reacting the 11-dodecenal with malonic acid to produce trans-2,13-tetradienoic acid, esterifying this acid with diazomethane to give methyl trans-2,13-tetradienoate; reacting said methyl trans-2,13-tetradienoate with ethyl acetoacetate in the presence of sodium ethoxide to prepare ethyl 6-(10-undecenyl)-β-dihydroresorcylate; brominating said resorcylate to give ethyl 3-bromo-6-(10-undecenyl)-β-dihydroresorcylate; reacting the dihydroresorcylate successively with sodium ethoxide and sulfuric acid to prepare ethyl 6-(10-undecenyl)-β-resorcylate; treating the foregoing resorcylate with benzyl chloride to give ethyl 6-(10-undecenyl)-β-resorcylate dibenzyl ether; subjecting the benzylated resorcylate to successive reaction with mercuric acetate, sodium hydroxide, sodium borohydride, and hydrochloric acid to yield the alcohol, ethyl 2,4-bis(benzyloxy)-6-(10-hydroxyundecyl)-benzoate; subjecting the foregoing alcohol to the action of sodium ethoxide to give (R,S)-zearalane dibenzyl ether and as a by-product the dimeric dilactone from 6-(10-hydroxyundecyl)-β-resorcylic acid dibenzyl ether; hydrogenating the foregoing benzyl derivatives to yield (R,S)-zearalane and the dimeric dilactone from 6-(10-hydroxyundecyl)-β-resorcylic acid.

In general, a homologue of (R,S)-zearalane and/or of the corresponding dimeric dilactone is prepared by substituting for 11-dodecenal in the foregoing sequence of reactions an unsaturated aldehyde having the formula:

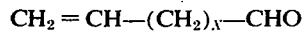

where X is an integer which may take the value 0, 1, 2, 3, 4, 5, 6, 7, 8, 10, 11, or 12.

Specifically (R,S)-norzearalane is prepared starting with 10-undecenal (X = 8) and the dimeric dilactone from 6-(4-hydroxypentyl)-β-resorcylic acid dibenzyl ether is prepared when the starting aldehyde is 5-hexenal (X = 3).

This invention is directed to new and improved processes for the chemical synthesis of the physiologically active macrolides known as zearalanes having the formula:

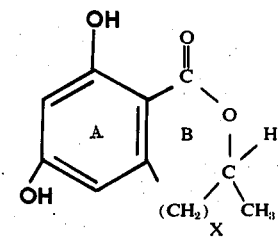

where X is an integer which may have the value 0, 1, 2, 3, 4, 5, 6, 7, 8, 9, 10, 11, or 12. When X = 9, the product is (R,S)-zearalane.

In the above formula, the letters A and B are used to denote the two different ring systems in the molecule.

It may be noted that (S)-zearalane has been prepared by Urry, Wehrmeister, Hodge, and Hidy, *Tetrahedron Letters*, 27, 3109–3114, (1966). The product of this invention, (R,S)-zearalane is a new composition, however, and it differs from the previously described (S)-zearalane.

The invention also covers physiologically active compounds related to the zearalanes and known as dimeric dilactones having the formula,

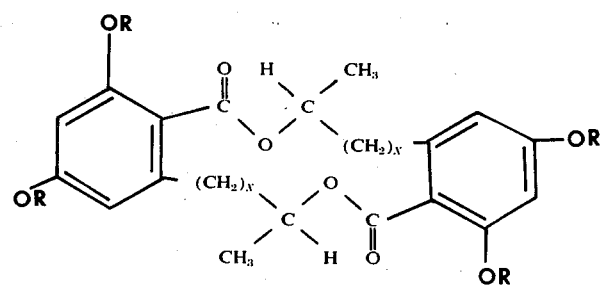

where X is an integer which may have the value 0, 1, 2, 3, 4, 5, 6, 7, 8, 9, 10, 11, or 12, and where R is either hydrogen or a benzyl radical ($C_6H_5CH_2$—).

More particularly, this invention relates to novel intermediates produced in the synthesis of the above compounds and to processes for making these intermediates.

It is an object of the present invention to provide a new synthesis of (R,S)-norzearalane and (R,S)-zearalane.

It is another object of the present invention to provide new syntheses for the preparation of derivatives of the zearalanes.

It is a further object of the present invention to provide new processes for producing intermediate compounds useful in the synthesis of (R,S)-zearalane, (R,S)-norzearalane, and derivatives of various zearalanes.

DETAILED DESCRIPTION (R,S)-zearalane and related compounds are useful anabolic agents in the production of animals such as sheep and cattle. One of the isomers of (R,S)-zearalane is produced from (S)-zearalenone which in turn is made by a fermentation process using the organism *Gibberella zeae* (Gordon) as described in U.S. Pat. No. 3,196,019.

The present invention is based upon the discovery that (R,S)-zearalane and related compounds can be readily prepared by the reactions set forth in the following charts:

CHART I: Sequence A. Reactions for the Chemical Synthesis of (R,S)-Norzearalane.
CHART II: Sequence B. Reactions for the Chemical Synthesis of (R,S)-Zearalane.
CHART III: Sequence C. Reactions for the Chemical Synthesis of Dimeric Dilactone from 6-(4-hydroxypentyl)-β-resorcylic acid dibenzyl ether.

All of the reactions have been found to proceed in a straightforward manner and may be conducted in apparatus and equipment found in the conventional chemical laboratory.

CHART I

Reactions for the Chemical Synthesis of (R,S)-Norzearalane
Sequence A

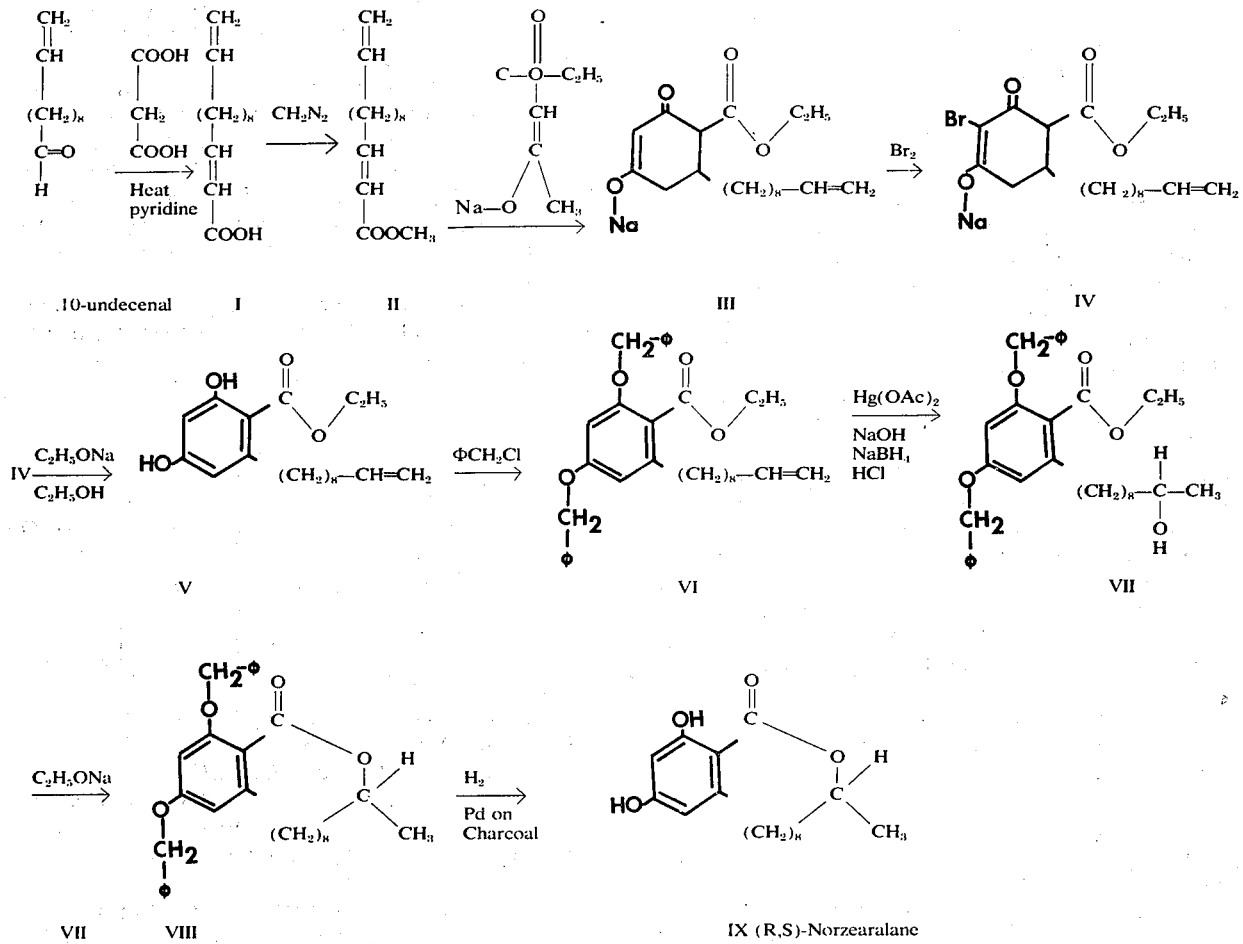

Notes:
(a) ΦCH₂Cl designates benzyl chloride;
(b) Hg(OAc)₂ is mercuric acetate.

CHART II

Reactions for the Chemical Synthesis of (R,S)-Zearalane
Sequence B

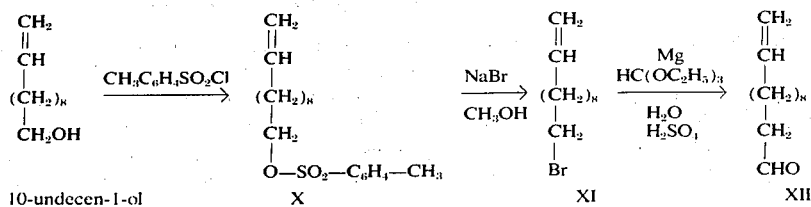

CHART II – Continued

Reactions for the Chemical Synthesis of (R,S)-Zearalane
Sequence B

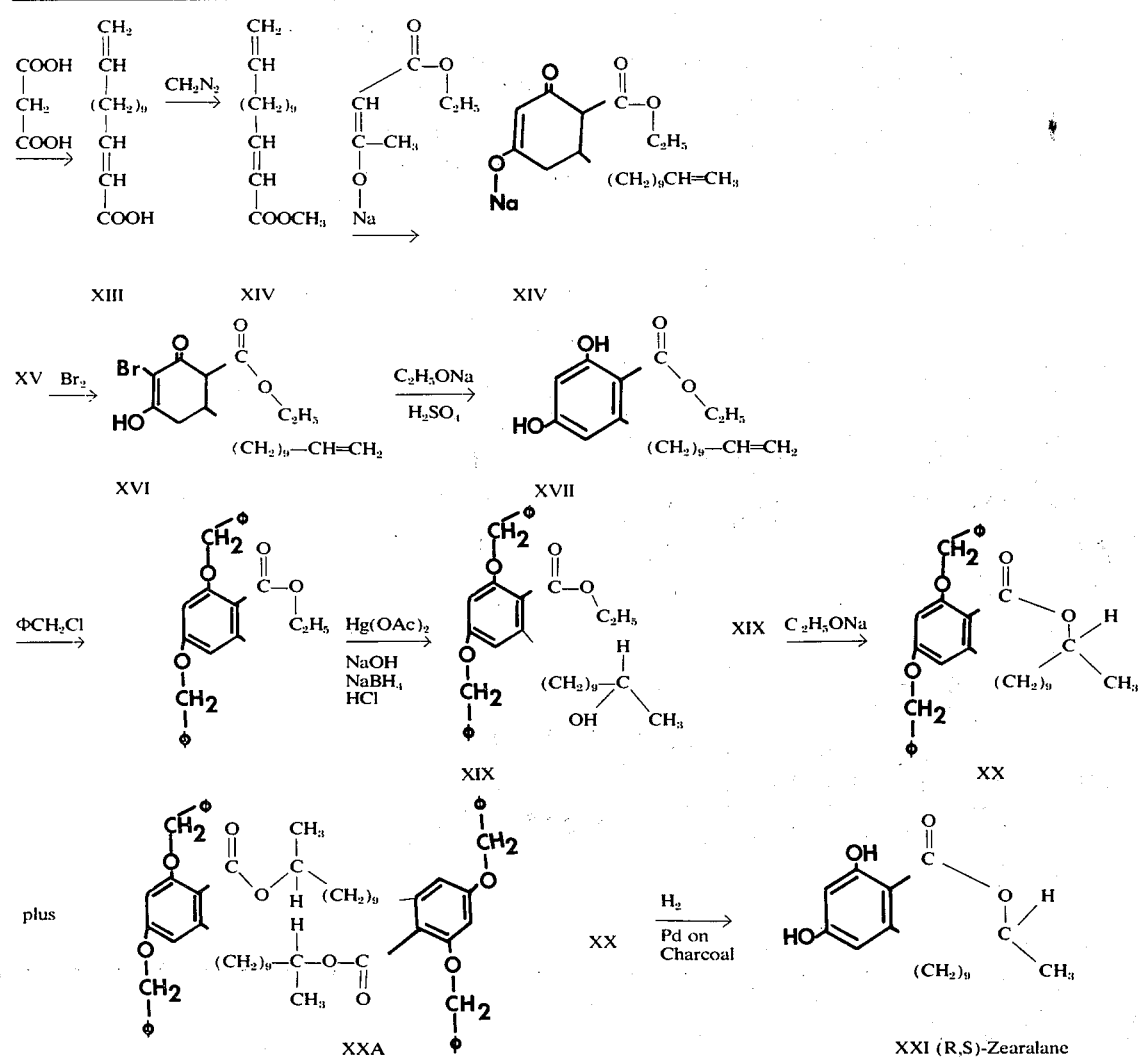

Notes:
(a) ΦCH₂Cl designates benzyl chloride;
(b) Hg(OAc)₂ is mercuric acetate;
(c) XXA H₂ dimeric dilactone from 6-(10-hydroxyundecyl)-δ-resorcylic acid, XXIA.

CHART III

Reactions for the Chemical Synthesis of Dimeric Dilactone
from 6-(4-Hydroxypentyl)-β-resorcylic Acid Dibenzyl Ether. Sequence C.

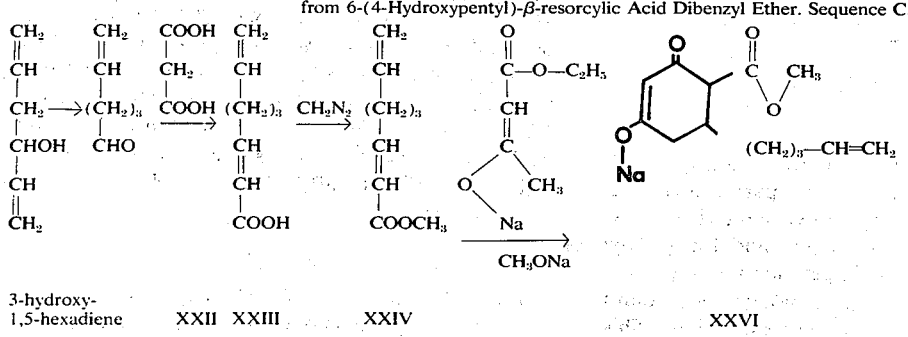

CHART III — Continued

Reactions for the Chemical Synthesis of Dimeric Dilactone from 6-(4-Hydroxypentyl)-β-resorcylic Acid Dibenzyl Ether. Sequence C.

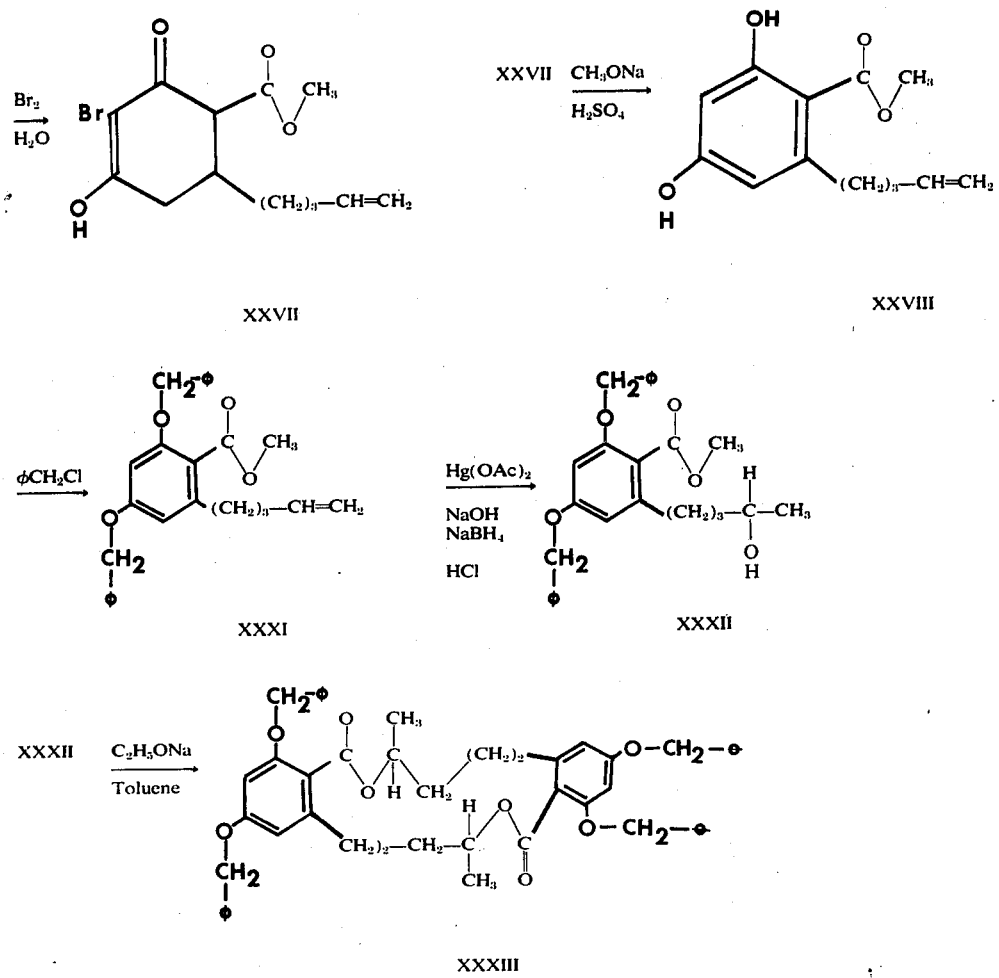

Notes:
(a) φCH₂Cl designates benzyl chloride;
(b) Hg(OAc)₂ is mercuric acetate

SEQUENCE A (R,S)-Norzearalane

This compound has the formula,

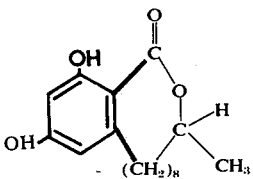

The first step in the synthesis is the reaction of 10-undecenal with malonic acid to prepare trans-2,12-tridecadienoic acid. This acid is converted to its methyl ester by reaction with diazomethane and the methyl ester is then reacted with ethyl acetoacetate under the influence of sodium ethoxide to produce the sodium salt of ethyl 6-(9-decenyl)-β-dihydroresorcylate. This salt is then brominated to give ethyl 3-bromo-6-(9-decenyl)-β-dihydroresorcylate which is treated with sodium ethoxide in an ethanol menstruum to yield ethyl 6-(9-decenyl)-β-resorcylate. The resorcylate ester is reacted with benzyl chloride to prepare ethyl 6-(9-decenyl)-β-resorcylate dibenzyl ether. The benzylated resorcylate is treated successively with mercuric acetate, sodium hydroxide, sodium borohydride, and hydrochloric acid to prepare ethyl 2,4-bis(benzyloxy)-6-(9-hydroxydecyl)benzoate. The alcohol produced in the foregoing reaction is subjected to the action of sodium ethoxide to effect ring closure and so produce (R,S)-norzearalane dibenzyl ether. The norzearalane derivative is reacted with hydrogen using a catalyst of palladium on charcoal to replace the benzylgroups with hydrogen atoms to yield (R,S)-norzearalane.

SEQUENCE B (R,S)-Zearalane and the Dimeric Dilactone from 6-(10-Hydroxyundecyl)-β-Resorcylic Acid The above compounds whose syntheses are described in this section have the formulas,

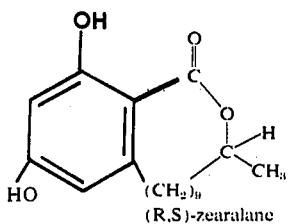

(R,S)-zearalane

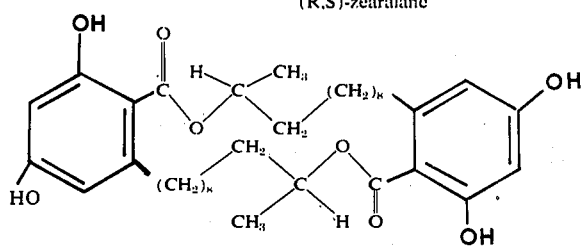

Dimeric dilactone from 6-(10-hydroxyundecyl)-β-resorcylic acid.

The starting reagent for this sequence of reactions is 10-undecen-1-ol which is treated with p-toluenesulfonyl chloride to give 10-undecen-1-yl p-toluenesulfonate. The sulfonate derivative on reaction with sodium bromide in methanol yields 1-bromo-10-undecene. The bromo compound is then subjected to a Grignard reaction with triethyl orthoformate to prepare 11-dodecenal which is reacted with malonic acid to produce trans-2,13-tetradecadienoic acid. This acid is esterified by reaction with diazomethane and the resulting methyl ester is treated with ethyl acetoacetate under the influence of sodium ethoxide to prepare the sodium salt of ethyl 6-(10-undecenyl)-β-dihydroresorcylate. The foregoing dihydroresorcylate is brominated to give ethyl 3-bromo-6-(10-undecenyl)-β-dihydroresorcylate which when treated successively with sodium ethoxide and with acid gives ethyl 6-(10-undecenyl)-β-resorcylate. This resorcylate ester when reacted with benzyl chloride produces ethyl 6-(10-undecenyl)-β-resorcylate dibenzyl ether. The foregoing resorcylate is treated successively with mercuric acetate, sodium hydroxide, sodium borohydride, and dilute hydrochloric acid to yield the secondary alcohol, ethyl 2,4-bis(benzyloxy)-6-(10-hydroxyundecyl)-benzoate. This secondary alcohol on treatment with sodium ethoxide in a toluene menstruum yields two compounds, namely, (R,S)-zearalane dibenzyl ether and the dimeric dilactone from 6-(10-hydroxyundecyl)-β-resorcylic acid dibenzyl ether. On hydrogenation in the presence of a palladium-on-charcoal catalyst these two compounds are converted to (R,S)-zearalane and the dimeric dilactone from 6-(10-hydroxyundecyl)-β-resorcylic acid, respectively.

SEQUENCE C

Dimeric Dilactone from
6-(4-hydroxypentyl)-β-Resorcylic Acid Dibenzyl Ether

The dimeric dilactone whose synthesis is described here is represented by the formula

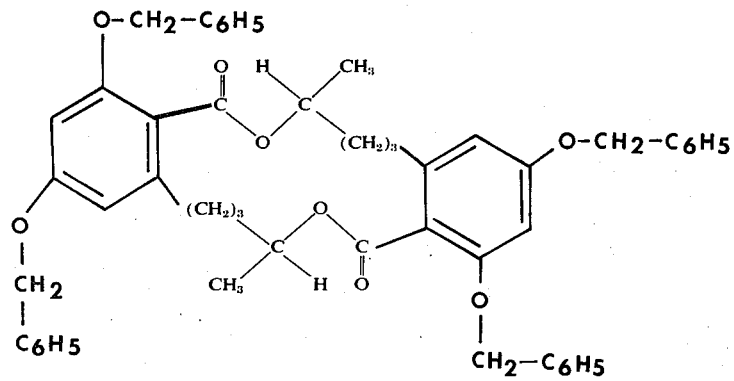

The first reaction in the sequence to produce the foregoing dimeric dilactone is the pyrolysis of 3-hydroxy-1,5-hexadiene at about 380°C to produce 5-hexenal which is then reacted with malonic acid to yield 2,7-octadienoic acid. Treatment with diazomethane converts this acid to its methyl ester which is then reacted with ethyl acetoacetate in a methanol medium containing sodium methoxide to yield the sodium salt of methyl 6-(4-pentenyl)-β-dihydroresorcylate. Bromination of the sodium salt of the dihydroresorcylate ester gives methyl 3-bromo-6-(4-pentenyl)-β-dihydroresorcylate which is treated successively with sodium methoxide and sulfuric acid to prepare methyl 6-(4-pentenyl)-β-resorcylate. Reaction of the foregoing resorcylate ester with benzyl chloride yields methyl 6-(4-pentenyl)-β-resorcylate dibenzyl ether which is then reacted successively with mercuric acetate, sodium hydroxide, sodium borohydride, and hydrochloric acid to produce the secondary alcohol, methyl 2,4-bis(benzyloxy)-6-(4-hydroxypentyl)-benzoate. This secondary alcohol under the influence of sodium ethoxide in a toluene menstruum produces the dimeric dilactone from 2,4-bis(benzyloxy)-6-(4-hydroxypentyl)benzoic acid.

In the three reaction sequences exhibited in Charts I, II, and III, there is considerable diversity in the products obtained because of a variation in the tendency of the secondary alcohols VII, XIX, and XXII to form monomeric compounds. The reactions of these alcohols to form monomer and dimer are shown below.

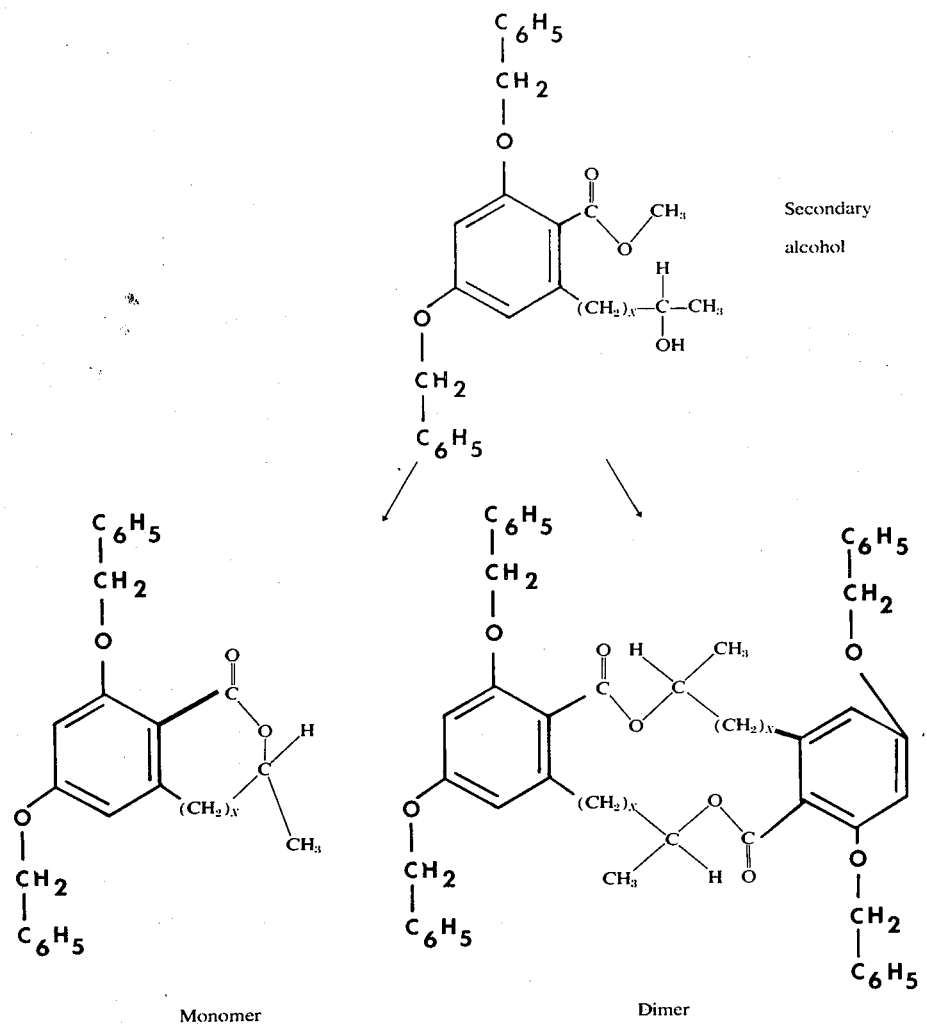

Monomer                Dimer

Whether monomer or dimer predominates, depends on the characteristics of the β-ring which is to be formed to give the monomer. Table I lists the various β-rings and indicates those in which monomer formation is most favorable.

TABLE I

Arbitrary Scale of Tendency of Alkyl 2,4-Bis(benzyloxy)-6-((x+1)-Hydroxyalkyl)-benzoates to Form Monomers

| Value of "X" | Number of Atoms in β-Ring of Monomer | Very low tendency = 0 High tendency = 10 |
|---|---|---|
| 0 | 5 | 10 |
| 1 | 6 | 10 |
| 2,3,4, or 5 | 7, 8, 9, or 10 | 0 |
| 6 or 7 | 11 or 12 | 2 |
| 8 | 13 | 4 |
| 9 | 14 | 5 |
| 10 | 15 | 6 |
| 11 | 16 | 8 |
| 12 | 17 | 9 |

The compounds produced by the process of this invention are useful in promoting the growth rate of meat-producing animals. The compounds can be administered to animals by any suitable method including subcutaneous injection of pellets under the skin of the ears of mammals as well as by oral and parenteral administrations. For example, the compounds can be formulated into pellets and put under the skin of the ear by a suitable gun or they can be suspended in a medium such as peanut oil and injected parenterally. The compounds can also be blended with ordinary feed containing nutritional values in an amount sufficient to produce the desired rate of growth and can thus be fed directly to animals.

When the compounds are to be fed directly to animals, the feed composition can be prepared containing the usual nutritionally balanced quantities of fats, carbohydrates, proteins, vitamins, and minerals together with the chosen compound. Some of these usual dietary elements are grains, such as ground grain and grain by-products; animal protein substances such as those found in fish meal and meat scraps; animal and vegetable fats; vegetable proteins like soybean oil meal or peanut oil meal; vitaminaceous materials, e.g. vitamin A and D mixtures; riboflavin supplements and other vitamin B complex members; antibiotic supplements such as zinc bacitracin feed grade; and bone meal and limestone to provide minerals. A type of conventional feed material for use with cattle includes alfalfa hay and ground corn cobs together with supplementary antibiotics and vitaminaceous materials if desired.

The amount of compound administered to the animal, of course, depends upon the specific animal, its age and sex, and the desired rate of growth. Usually, administration of from about 1 to about 100 mg. of a compound per animal per day produces significantly increased growth rate.

The abbreviations used in the following examples are described in these paragraphs. The description of a nuclear magnetic resonance (nmr) scan is identified by the letters nmr followed by the solvent and reference substance placed in parenthesis; thus, nmr ($CDCl_3$, TMS) means that the scan was made with deuterated chloroform as the solvent and tetramethylsilane as the reference substance. The position of the identified peaks may be described by the value:

$\delta$ = cycles per second from TMS divided by 60 (This relation applies with a 60 megaherz instrument)
$\delta$ = c.p.s. ÷ 60
or by $\tau$ = 10 minus $\delta$ (10— )

The type of peak is shown by the first letter of the word describing the peak and is followed by a numeral indicating the number of hydrogen atoms involved. Examples are as follows:

s,1 = singlet, one hydrogen
s,2 = singlet, two hydrogens
d,1 = doublet, one hydrogen
t,2 = triplet, two hydrogens
m,4 = multiplet, four hydrogens
broad s,1 = a broad singlet for one hydrogen which may result from O$\underline{H}$, COO$\underline{H}$, C$\underline{H}$O.

Coupling constants are valuable for identification of the positions of hydrogen atoms and with respect to variations of the electronic environments. The coupling constants are measured as the distance between the peaks in question on the x-axis of the scan and are recorded as J values in terms of c.p.s.

Cycles per second are denoted by c.p.s. and by Hz.

In all of the examples, the temperatures are in degrees centigrade. In the n.m.r. data, TMS is tetramethylsilane; DSS is sodium 2,2-dimethyl-2-silapentane-5-sulfonate.

The following examples serve to illustrate the invention and set forth the best mode contemplated by the inventors for carrying out the invention.

EXAMPLE 1

In Example 1, trans-2,12-tridecadienoic acid is made by the following general reaction wherein X = 8:

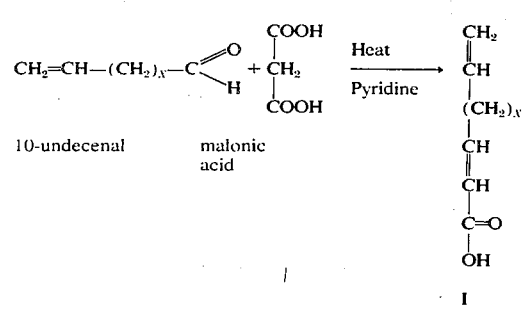

trans-2,12-Tridecadienoic acid I

A reaction mixture containing 100.8 g, 0.599 mol, of 10-undecenal, 41.6 g, 0.398 mol, of malonic acid and 140 g of pyridine was stirred at 25° for 24 hr under nitrogen. After an additional 41.6 g of malonic acid was added, it was again stirred for another 24 hr at 25°. Then it was heated on a steam bath until carbon dioxide evolution ceased (12 hr). It was diluted with water (250 ml), and the resulting mixture was extracted with ether (3 × 200 ml). The ether extract was washed with dilute hydrochloric acid (2 N, 4 × 50 ml), with water, and then dried ($MgSO_4$). Its distillation gave unreacted 10-undecenal (bp 40° at 1.0 mm), and then 96.3 g, 0.458 mol (76%), of I; bp 164°–65° (0.1 mm); nmr ($CDCl_3$, TMS) $\delta$12.66 (s, 1, COO$\underline{H}$), 7.22 and 6.96 (2 t, 1, $J_{AB}$ = 15.7 Hz, $J_{AX}$ = 7 Hz, C$\underline{H}_2$C$\underline{H}$=C$\underline{H}$), 5.93 and 5.67 (2 t, 1, $J_{AB}$ = 15.7 Hz, $J_{AX}$ = 1 Hz, C$\underline{H}$CO), 5.72, 4.92 and 4.88 (3 m, 3, typical C$\underline{H}_2$=C$\underline{H}$), 2.08 (br m, 4, C$\underline{H}_2$CH=C), and 1.35 ppm (br m, 12, C$\underline{H}_2$(C$\underline{H}_2$)$_6$C$\underline{H}_2$).

EXAMPLE 2

Example 2 shows the preparation of methyl trans-2,12-tridecadienoate by the following general reaction wherein X = 8:

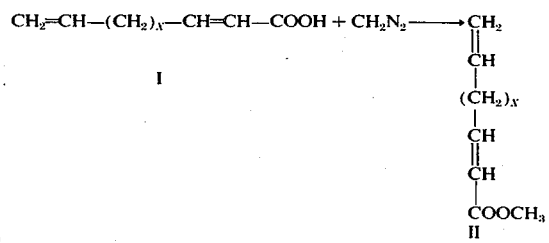

Methyl trans-2,12-tridecadienoate II

A solution of diazomethane in ether was added to a stirred, cold (0°) solution of 95.0 g, 0.454 mol, of I in 150 ml of ether until the yellow color persisted. The ether was evaporated to give 104.0 g of the crude ester, that was distilled with a Nestor-Faust spinning band fractionating column to give 96.7 g, 0.422 mol (93%), of II: bp 112°–113° (0.4 mm); nmr ($CDCl_3$, TMS) $\delta$7.07 and 6.81 (2 t, 1, $J_{AB}$ = 15.7 Hz, $J_{AX}$ = 7 Hz, C$\underline{H}_2$C$\underline{H}$=C$\underline{H}$), 5.91 and 5.65 (2 t, 1, $J_{AB}$ = 15.7 Hz, $J_{AX}$ = 1 Hz, C$\underline{H}$CO), 5.72, 4.92 and 4.88 (3 m, 3, C$\underline{H}_2$=C$\underline{H}$), 3.66 (s, 3, OC$\underline{H}_3$), 2.12 (br m, 4, C$\underline{H}_2$CH=C), and 1.34 ppm (br m, 12, C$\underline{H}_2$—(C$\underline{H}_2$)$_6$C$\underline{H}_2$).

EXAMPLE 3

Example 3 illustrates the preparation of ethyl 6-(9-decenyl)-$\beta$-dihydroresorcylate and its sodium salt by the following general reaction wherein X = 8:

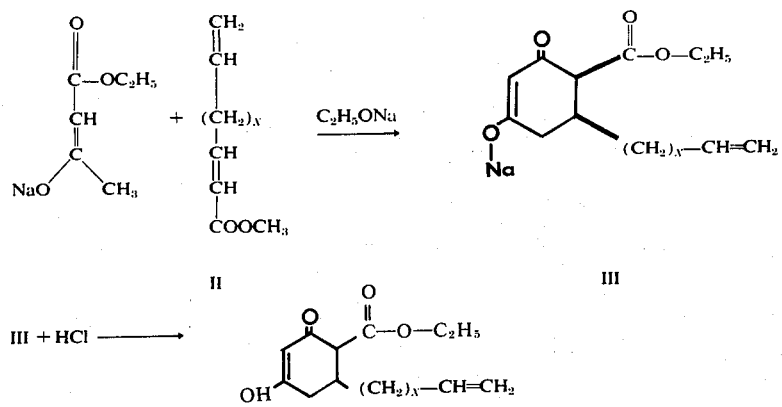

II

III + HCl ⟶

Ethyl 6-(9-decenyl)-β-dihydroresorcylate

Ethyl 6-(9-decenyl)-β-dihydroresorcylate and its mono-sodium salt III 8.9 g, 0.404 g-atom, of sodium was added to 130 ml of anhydrous ethanol. After the reaction of sodium was complete, 50.5 g, 0.388 mol of freshly-distilled ethyl acetoacetate was added dropwise with stirring under nitrogen. This reaction mixture was held at reflux while 72.3 g, 0.323 mol, of II also was added dropwise over 1 hr, and then it was stirred for 20 hr. After the reaction mixture was cooled to 0°, the solid that had precipitated was removed on a filter and was washed with ether until it was white to give 89.2 g, 0.262 mol (84%), of the sodium salt III: nmr (D₂O, DSS) δ5.72, 4.92 and 4.88 (3 m, 3, CH₂=CH), 4.22 (q, 2, J = 7 Hz, COOCH₂), 3.18 and 2.20 (2 m, 3, ring tautomers), 2.00 (br m, 2, CH₂CH=CH₂), and 1.28 ppm (br m, 18, CH(CH₂)₇—CH and CH₃).

A solution of 3.00 g, 0.00872 mol, of III in 50 ml of water was made acidic with hydrochloric acid (3 N). The resulting mixture was extracted with ether (4 × 25 ml). The ether solution was washed with water (4 × 25 ml), and dried (MgSO₄). It was evaporated to give a residue that crystallized from ligroin (bp 60°–68°) to yield 2.28 g, 0.00706 mol (81%) of the β-dihydroresorcylate from III: mp 59°–60°; nmr (CDCl₃, TMS) δ6.80 (s, ca. 1, tautomeric hydroxyl), 5.72 4.92 and 4.88 (3 m, 3, typical CH=CH₂), 4.20 (q, 2, J = 7 Hz, COOCH₂), 5.52, 3.15, 3.12 and 2.46 (4 m, ca. 4, ring tautomers), 2.06 (br m, 2, CH₂CH=CH₂), 1.32 (br m, 15, CH(CH₂)₇CH₂), and 1.28 ppm (t, 3, J = 7 Hz, CH₃).

Anal. Calcd. for C₁₉H₃₀O₄: C, 70.8; H, 9.4. Found: C, 70.6; H, 9.5.

EXAMPLE 4

Example 4 exhibits the preparation of ethyl 3-bromo-6-(9-decenyl)-β-dihydroresorcylate by the following general reaction wherein X = 8:

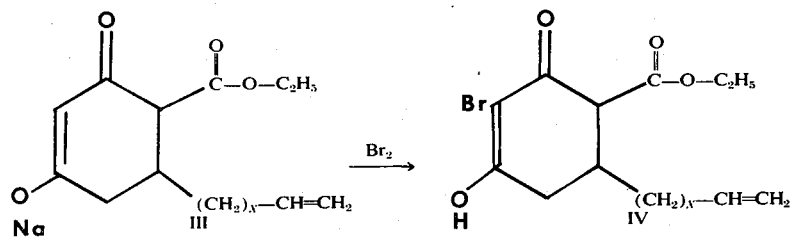

Ethyl 3-bromo-6-(9-decenyl)-β-dihydroresorcylate IV

A solution of 16.7 g, 0.104 mol, of bromine and 60.0 g, 0.58 mol, of sodium bromide in 200 ml of water was added dropwise over 4 hr to one of 34.5 g, 0.100 mol, of the sodium salt III in 700 ml of water that was stirred rapidly at 0°. After 15 minutes of additional stirring, the flocculent solid that had precipitated was collected on a filter. It was dissolved in 200 ml of ether, the ether solution was washed with water (3 × 75 ml), and briefly dried (MgSO₄, discolored with longer drying time). The ether solution was evaporated in a vacuum rotary evaporator (Rinco), and the residual product was recrystallized from 200 ml of ligroin (bp 30°–60°) to give 26.0 g, 0.0648 mol (65%), of white IV: mp 93°–94°; nmr (CDCl₃, TMS) δ6.70 (br, s, ca. 1, 4-OH), 5.72, 4.92 and 4.88 (3 m, 3, CH₂=C), 4.22 (q, 2, J = 7 Hz, COOCH₂), 3.35, 2.72 and 2.43 (3 m, ca. 3, ring tautomers), 2.06 (br m, 2, CH₂CH=CH₂), and 1.30 ppm (br m, 18, CH(CH₂)₇CH₂ and CH₃).

Anal. Calcd. for C₁₉H₂₉O₄ Br: C, 56.9; H, 7.3; Br, 19.9. Found: C, 56.6; H, 7.3; Br, 20.2.

In Example 4, the temperature at which the reaction of bromine with Compound IV is allowed to occur is kept at 0°C in order to minimize the reaction of bromine with the double bond in the side chain of the compound. Temperatures up to 25°C could be used for this reaction but 0°C is preferred. A lower temperature limit of about −10°C is set since the rate of the desired reaction becomes too low at temperatures much below −10°C. If the temperature goes much below −10°C, the mixture would tend to freeze.

EXAMPLE 5

Example 5 elucidates the preparation of ethyl 6-(9-decenyl)-β-resorcylate by the following general reactions wherein X = 8:

In Example 5 the de-hydrobromination of compound IV can be effected at temperatures in the range 60°–120°C but a temperature near 80°C is preferred. At a temperature of 80°C the rate of de-hydrobromination is reasonably fast.

The de-hydrobromination step could be carried out in a menstruum of an alcohol other than ethanol, for example methanol or butanol.

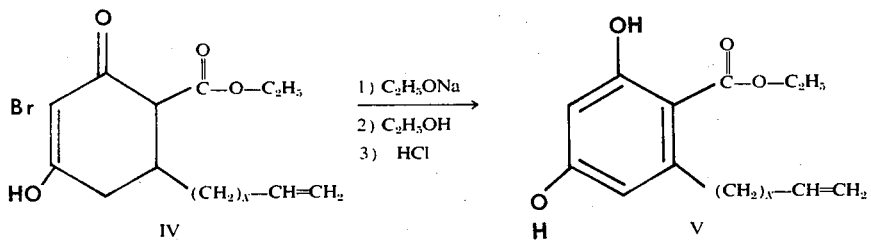

Ethyl 6-(9-decenyl)-β-resorcylate V 45.0 g, 0.112 mol, of IV in a sodium ethoxide solution (prepared from 20.00 g, 0.870 g-atom, of sodium in 500 ml anhydrous ethanol) was held at reflux under nitrogen for 3 hr. Then, about 400 ml of ethanol was evaporated under vacuum. The reaction mixture was diluted with water to 500 ml while it was cooled in ice, and then it was acidified with hydrochloric acid (6 N). It was extracted with ether (3 × 200 ml), and the extract was washed with water (4 × 200 ml) until these washings were neutral to pH paper. This orange solution was decolorized with charcoal, and the ether was evaporated to yield 34.1 g (95%) of crude V. A dry column chromatographic separation (680 g Silica Gel H heated before use at 110° for 14 hr, 10% ether in methylene chloride), and then recrystallization from ligroin (bp 30°–60°), gave 19.0 g, 0.0594 mol (53%) of pure V: mp 45.5°–46.5°; nmr (CDCl$_3$, TMS) δ11.88 (s, 1, hydrogen-bonded 2-OH), 7.15 (br s, 1, 4-OH), 6.33 and 6.30 (2 d, 2, J = 2 Hz, aromatic CH), 5.72, 4.92 and 4.88 (3 m, 3, CH$_2$=CH), 4.40 (q, 2, J = 7 Hz, COOCH$_2$), 2.83 (t, 2, J = 6 Hz, ArCH$_2$), 2.00 (m, 2, CH$_2$CH=C), 1.40 (t, 3, J = 7 Hz, CH$_3$), and 1.32 ppm (m, 12, CH$_2$(CH$_2$)$_6$CH$_2$).

Anal. Calcd. for C$_{19}$H$_{28}$O$_4$: C, 71.2; H, 8.8. Found: C, 71.0; H, 8.6.

EXAMPLE 6

In Example 6, ethyl 6-(9-decenyl)-β-resorcylate dibenzyl ether is produced by the following general reaction wherein X = 8:

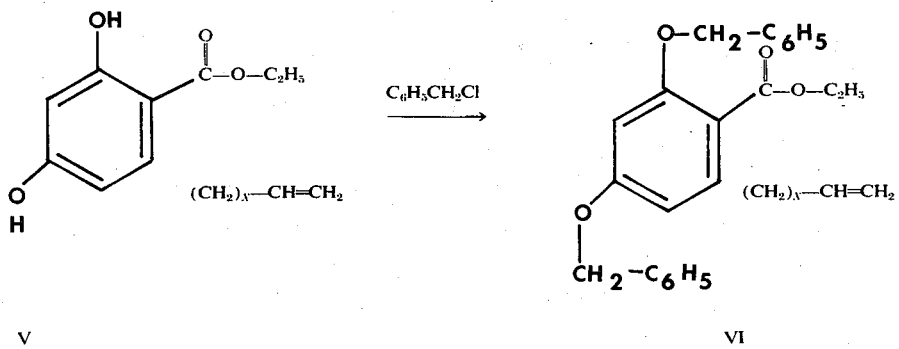

Ethyl 6-(9-decenyl)-β-resorcylate dibenzyl ether VI

A reaction mixture containing 9.00 g, 0.0281 mol, of V, 10.9 ml, 0.0872 mol, of benzyl chloride, and 20 g of anhydrous potassium carbonate in 150 ml of dried dimethyl sulfoxide was stirred while it was heated on a steam bath for 6 hr. Then 300 ml of water was added to it. The oil that separated was taken into 200 ml of ether, and 200 ml of pentane was added to this extract. It was washed with water (8 × 50 ml) and dried (MgSO$_4$). Solvents were evaporated under vacuum to give 13.0 g, 0.0260 mol (92%), of VI that had the expected nmr spectrum: nmr (CDCl$_3$, TMS) δ7.24 (m, 10, C$_6$H$_5$), 6.41 (s, 2, aromatic CH), 5.72 4.92 and 4.88 (3, m, 3, CH=CH$_2$), 4.90 and 4.87 (2 s, 4, benzyl CH$_2$), 4.25 (q, 2, J = 7 Hz, COOH$_2$), 2.58 (t, 2, J = 6 Hz, ArCH$_2$), 2.00 (m, 2, CH$_2$CH=C), 1.28 (br m, 12, CH$_2$(CH$_2$)$_6$CH$_2$), and 1.18 ppm (t, 3, J = 7 Hz, CH$_3$).

EXAMPLE 7

In Example 7, ethyl 2,4-bis(benzyloxy)-6-(9-hydroxydecyl)-benzoate is prepared by the following general reactions wherein X = 8:

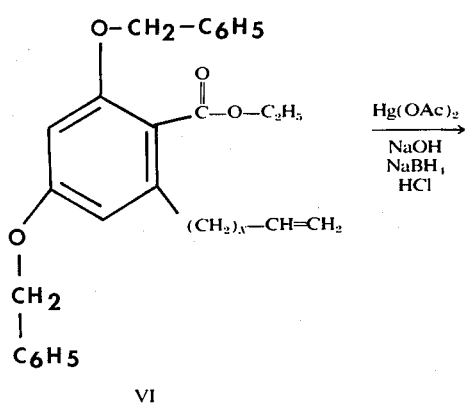 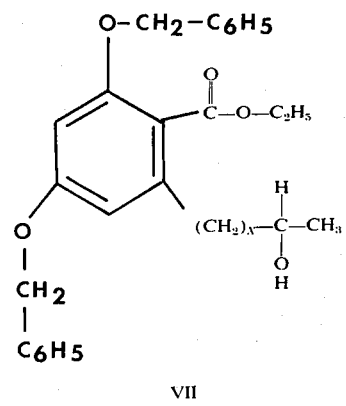

Ethyl 2,4-Bis(benzyloxy)-6-(9-hydroxydecyl)-benzoate, VII 5.00 g, 0.010 mol, of VI in 150 ml of tetrahydrofuran was added to a stirred solution of 31.87 g, 0.100 mol, of mercuric acetate in 100 ml of water. After this solution was stirred for 48 hr at 25°, 120 ml of 3 N sodium hydroxide was added to it, and stirring was continued for another 30 min. Then 2.40 g, 0.0634 mol, of sodium borohydride dissolved in 100 ml of 3 N sodium hydroxide solution was added, and stirring was again continued for 30 min. The reaction mixture was chilled to 0°, and then was acidified with dilute hydrochloric acid. The oil that separated was extracted with ether (3 × 100 ml), and this extract was washed with water (3 × 75 ml) and dried (MgSO$_4$). Evaporation of the ether in a vacuum rotary evaporator (Rinco) gave 4.80 g of semi-solid residue that was chromatographed (dry column, Silica Gel H, 10% ethyl ether in methylene chloride) to give 1.50 g of unreacted VI and 2.80 g, 0.00530 mol (53%) of a liquid VII: nmr (CDCl$_3$, TMS) δ7.28 (m, 10, C$_6$H$_5$), 6.42 (s, 2, aromatic CH), 4.90 and 4.87 (2 s, 4, benzyl CH$_2$), 4.53 (br s, 1, OH), 4.28 (q, 2, J = 7 Hz, COOCH$_2$), 3.70 (br m, 1, CHOH), 2.60 (t, 2, J = 6 Hz, ArCH$_2$), 1.28 (br m, 14, CH$_2$(CH$_2$)$_7$CH), 1.24 (t, 3, J = 7 Hz, CH$_2$CH$_3$) and 1.11 ppm (d, 3, J = 6 Hz, CHCH$_3$).

The reaction of the olefinic compound VI with mercuric acetate has been carried out at 25°C in Example 7. The temperature limits for this reaction are 0° and 60°C. Below 0°C the reaction is too slow and above 60°C unwanted side reactions occur.

EXAMPLE 8

In Example 8, (R,S)-norzearalane dibenzyl ether is formed by the following general reaction wherein X = 8:

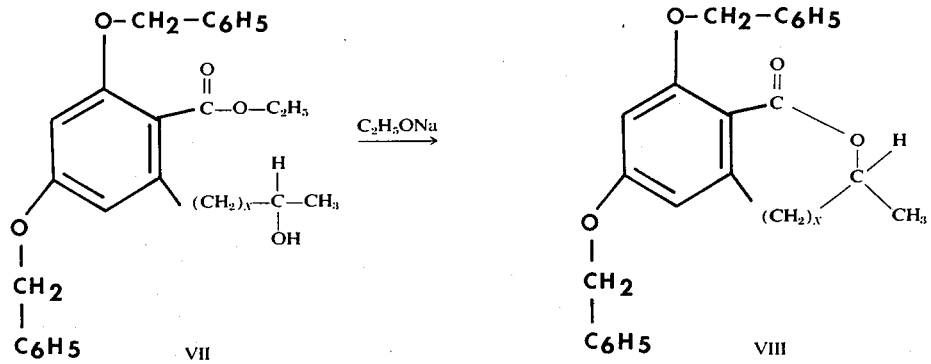

(R,S)-Norzearalane Dibenzyl Ether, VIII

A solution of 10.40 g, 0.02202 mol, of VII, and sodium ethoxide prepared from 0.46 g, 0.0202 g-atom, of sodium with 50 ml of anhydrous ethanol, in 1.0 l. of dried toluene was held under reflux beneath a fractionating column while all of the ethanol and part of the toluene was slowly distilled over 36 hr. After the reaction mixture had cooled, it was acidified with 3 N hydrochloric acid, and then it was washed with water until the washings were neutral. 10.0 g of residue was obtained by evaporation of solvent under vacuum. 4.0 g of this material was then submitted to dry column chromatography (Silica Gel H, 10% ethyl ether in methylene chloride).

EXAMPLE 9

In Example 9, (R,S)-norzearalane is made by the following general reaction wherein X = 8:

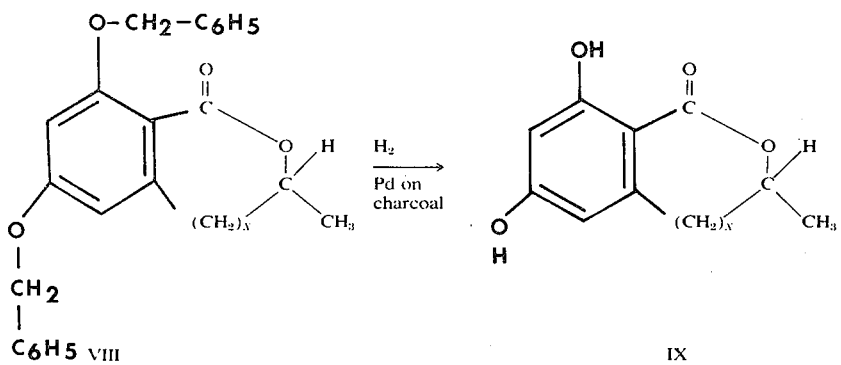

Recrystallization of appropriate fractions from 50% ethyl ether in pentane yielded 0.85 g, 0.0018 mol (22%), of VIII: mp 148°–150°; nmr (CDCl$_3$ TMS) $\delta$7.34 (m, 10, C$_6$H$_5$), 6.42 (s, 2, aromatic CH), 5.24 (br m, 1, COOCH), 5.00 and 4.97 (2 s, 4, benzylic CH$_2$), 2.57 (br m, 2, ArCH$_2$), 1.30 (br m, 14, CH$_2$(CH$_2$)$_7$CH), and 1.12 ppm (d, 3, J = 7 Hz, CH$_3$).

Anal. Calcd. for C$_{31}$H$_{36}$O$_4$: C, 78.8; H, 7.7. Found: C, 78.6; H, 7.6.

In Example 8, ring closure of compound VII is effected by heating the compound in a dry menstruum which is initially ethanol-toluene and which becomes toluene in the latter stages of the operation at a temperature in the range 75°–110°C. This temperature range could be lowered somewhat but the reaction becomes very slow below 60°C. Temperatures above 110°C can be used but at temperatures much beyond 120°C undesirable reactions occur.

(R,S)-Norzeralane, IX

A solution of 1.50 g of the crude residue above (shown by the chromatographic purification to contain 0.38 g, 0.0008 mol, of VIII) in 20 ml of ethanol and 50 ml of ethyl acetate with 0.5 g of 5% palladium on charcoal and 2 drops of triethylamine was stirred under 1 atmosphere of hydrogen until this gas was no longer consumed. The reation mixture was filtered, and then it was evaporated in a vacuum rotary evaporator (Rinco). The residual product was separated by dry column chromatography (Silica Gel H, 10% ethyl ether in methylene chloride) to give fractions containing IX that were recrystallized from acetone to give 0.20 g, 0.00068 mol (95%), of pure IX: mp 247°–48°; nmr (acetone-d$_6$, TMS) $\delta$11.86 (s, 1. 2-OH), 6.32 (d, 1, J = 2.5 Hz, aromatic CH), 6.28 (d, 1, J = 2.5 Hz, aromatic CH), 5.20 (br m, 1, COOCH), 3.35 (br m, 1, 4-OH), 2.48 (br m 2, ArCH$_2$), 1.42 (br m, 14, CH$_2$(CH$_2$)$_7$CH) and 1.31 ppm (upfield peak of d, 3, CH$_3$). Its nmr and mass spectra were the same as those of IX prepared before. A melting point of a mixture of the two was 247°–248°.

EXAMPLE 10

Example 10 shows the preparation of 10-undecen-1-yl p-toluenesulfonate by the following general reaction wherein X = 8:

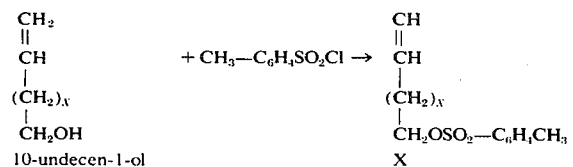

10-undecen-1-ol

10-Undecan-1-yl p-toluenesulfonate X

To a stirred solution of 100.0 g, 0.538 mol, of 10-undecen-1-ol in 190 ml of pyridine protected by a calcium chloride drying tube and cooled in an ice bath, 123.1 g, 0.646 mol, of p-toluenesulfonyl chloride was added at a rate that maintained the temperature below 10°. After this reaction mixture had been stirred at room temperature for 3 hr, it was acidified with 3 N hydrochloric acid while it was held at 0°. It was then extracted with ether (3 × 400 ml) and the extract was washed with water (5 × 200 ml). The ether solution was dried (MgSO$_4$), and the solvent was removed under vacuum to yield 163.9 g, 0.505 mol (94%), of X: nmr (CDCl$_3$, TMS) $\delta$7.76 (d, 2, J = 8 Hz, aromatic CH), 7.31 (d, 2, J = 8 Hz, aromatic CH), 5.72, 4.92 and 4.88 (3 m, 3, CH=CH$_2$), 4.00 (t, 2, J = 6 Hz, CH$_2$OS), 2.36 (s, 3, CH$_3$), 1.87 (br m, 2 CH$_2$CH=CH$_2$), and 1.23 ppm (br m 14, CH$_2$(CH$_2$)$_7$CH$_2$).

EXAMPLE 11

Example 11 illustrates the preparation of 1-bromo-10-undecene by the following general reaction wherein X = 8:

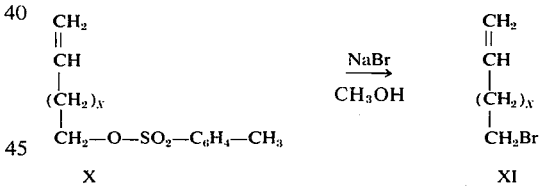

1-Bromo-10-undecene XI

A solution of 165.00 g, 0.509 mol, of X and 62.4 g, 0.607 mol of sodium bromide in 600 ml of methanol (dried by distillation from sodium methoxide) was distilled until 50 ml of the methanol had been removed, and then it was maintained under nitrogen at reflux for 6 hr. The solvent was removed under vacuum, 500 ml of water was added to the residue, and the organic layer was extracted into ether (3 × 500 ml). This extract was washed with water (3 × 300 ml), dried (MgSO$_4$), and evaporated to yield 110.0 g of a residue that was fractionally distilled to give 88.9 g, 0.378 mol, (74%) of XI: bp 76°–77° (0.10 mm); nmr (CDCl$_3$, TMS) $\delta$5.72, 4.92 and 4.88 (3 m 3 CH=CH$_2$), 3.37 (t, 2, J = 7 Hz, CH$_2$Br), 2.00 (br m, 2, CH$_2$CH=CH$_2$), and 1.33 ppm (br m, 14, CH$_2$(CH$_2$)$_7$CH$_2$).

EXAMPLE 12

Example 12 exhibits the preparation of 11-dodecenal by the following general reaction wherein X = 8:

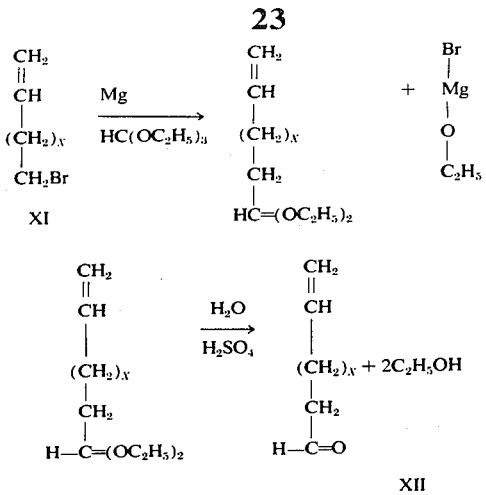

XI

XII

11-Dodecenal XII

With the usual procedure for the preparation of a Grignard reagent, a solution of 169.3 g, 0.727 mol, of XI in 500 ml of anhydrous ether was added to 21.2 g, 0.872 g-atom, of magnesium turnings with stirring. After the addition was complete, the reaction mixture was held at reflux for 2 hr. Then, a solution of 161.7 g, 1.09 mol, of triethylorthoformate (dried by distillation) in 200 ml of anhydrous ether was added over 1 hr while the reaction mixture was held at reflux. It was held at reflux for an additional 5 hr. Finally, it was cooled to 0° and stirred while 300 ml of 3 N sulfuric acid was added to it. The ether layer was separated, and the aqueous phase was extracted with ether (2 × 200 ml). The ether extract was washed once with water, and then it was evaporated. The residual product was treated with 200 ml of 3 N sulfuric acid, and the mixture was heated on a steam bath with stirring for 3 hr. It then was extracted with ether (3 × 150 ml). The extract was washed with water until these washings were neutral, and then was dried (MgSO$_4$). Distillation gave 82.0 g, 0.449 mol (62%), of XII: bp 99°–100° (3.5 mm), 48°–49° (0.03 mm); nmr (CDCl$_3$, TMS) δ9.64 (t, 1, J = 1.5 Hz, C$\underline{H}$O), 5.72, 4.92 and 4.88 (3 m, 3, C$\underline{H}$=C$\underline{H}_2$), 2.36 (m, 2, C$\underline{H}_2$CO), 1.96 (br m 2, C$\underline{H}_2$CH=CH$_2$), and 1.30 ppm (br m, 14, CH$_2$(C$\underline{H}_2$)$_7$CH$_2$).

Note: The literature lists the boiling point of XII as 100°–102° at 3.5 mm. M. Meyer, *Compt. Rend.*, 204, 508–9 (1937).

EXAMPLE 13

In Example 13, trans-2,13-tetradecadienoic acid is produced by the following general reaction wherein X = 9:

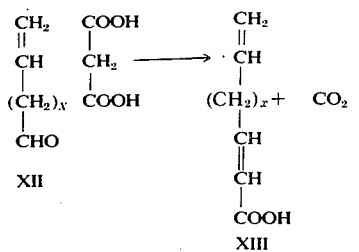

Preparation of trans-2,13-tetradecadienoic acid XIII

A reaction mixture containing 63.31 g, 0.348 mol, of XII, 39.80 g, 0.383 mol, of malonic acid and 75 ml of pyridine was stirred at 25° under nitrogen for 109 hr, and then it was heated on a steam bath until carbon dioxide evolution ceased (13 hr). Water (75 ml) was added to it, and the resulting mixture was extracted with ether (2 × 200 ml). The extract was washed with dilute hydrochloric acid (2 N, 2 × 50 ml), with water, and then dried (Na$_2$SO$_4$). Its distillation gave 56.77 g, 0.253 mol, (73%) of trans-2,13-tetradecadienoic acid XIII: bp 140°–141° (0.09 mm); n$_D^{25}$ 1.4741; nmr (CDCl$_3$, TMS) δ11.54 (s, 1, COO$\underline{H}$), 7.26 and 7.00 (2 t, 1, J$_{AB}$ = 15.7 Hz, J$_{AX}$ = 7 Hz, CH$_2$C$\underline{H}$=CHCO), 5.98 and 5.70 (2 t, 1, J$_{AB}$ = 15.7 Hz, J$_{AX}$ = 1 Hz, C$\underline{H}$CO), 5.72 4.92 and 4.88 (3 m, 3, C$\underline{H}$=C$\underline{H}_2$), 2.12 (br m, 4, C$\underline{H}_2$CH=C), and 1.32 ppm (br m, 4, CH$_2$(C$\underline{H}_2$)$_7$CH$_2$).

Anal. Calcd. for C$_{14}$H$_{24}$O$_2$: C, 75.0; H, 10.8. Found C, 75.0; H, 10.9.

EXAMPLE 14

In Example 14, methyl trans-2,13-tetradecadienoate is prepared by the following general reaction wherein X = 9:

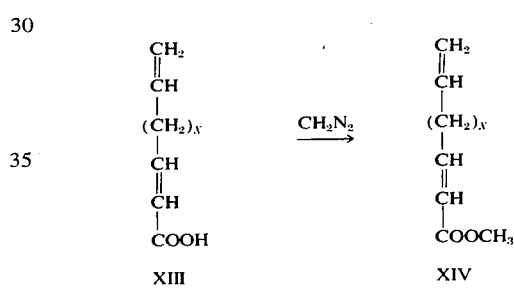

Methyl trans-2,13-tetradecadienoate XIV

A solution of diazomethane in ether was added to a stirred, cold (0°) solution of 56.77 g, 0.253 mol, of XIII in 100 ml of ether until its yellow color persisted. The ether was then evaporated to give 58.0 g of crude ester. Its fractional distillation gave 52.89 g, 0.222 mol, (88%) of XIV: bp 120°–123° (0.35 mm); n$_D^{25}$ 1.486; nmr (CDCl$_3$, TMS) δ7.04 and 6.78 (2 t, 1, J$_{AB}$ = 15.7 Hz, J$_{AX}$ = 7 Hz, CH$_2$C$\underline{H}$=CHCO), 5.87 and 5.61 (2 t, 1, J$_{AB}$ = 15.7 Hz, J$_{AX}$ = 1 Hz, CH=C$\underline{H}$CO), 5.72 4.92 and 4.88 (3 m, 3, C$\underline{H}$=C$\underline{H}_2$), 3.67 (s, 3, C$\underline{H}_3$), 2.12 (br m, 4, C$\underline{H}_2$CH=C), and 1.30 ppm (br m, 14, CH$_2$(C$\underline{H}_2$)$_7$CH$_2$).

Anal. Calcd. for C$_{15}$H$_{26}$O$_2$: C, 75.6; H, 11.0. Found: C, 75.8; H, 11.2.

EXAMPLE 15

In Example 15, the sodium salt of ethyl 6-(10-undecenyl)-β-dihydroresorcylate is formed by the following general reaction wherein X = 9:

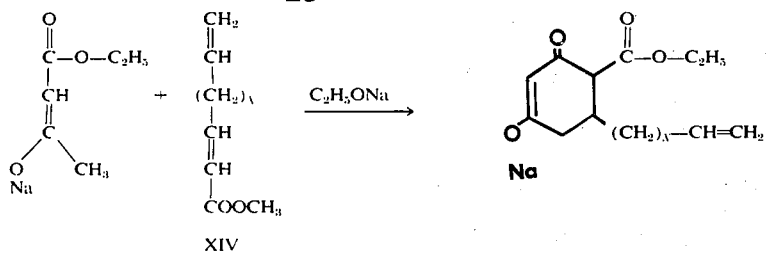

XIV  →  XV

The sodium salt of ethyl 6-(10-undecenyl)-β-dihydroresorcylate XV

When the reaction of 6.14 g, 0.267 mol, of sodium in 87 ml of anhydrous ethanol was complete, 34.7 g, 0.267 mol, of freshly-distilled ethyl acetoacetate was added dropwise with stirring under nitrogen. Then, the reaction mixture was stirred at reflux while 52.89 g, 0.222 mol, of XIV was added to it dropwise. As it was heated for an additional 22 hr and was subsequently cooled to 0°, a solid precipitated. It was recovered on a filter, and it was washed with ether until it was white to give 56.36 g of XV. Additional such solid precipitated when 50 ml of ether was added to the filtrate to give a total of 62.94 g, 0.176 mol, (79%) of XV: nmr (D₂O, DSS) δ5.72, 4.92 and 4.88 (3 m, 3, (CH=CH₂), 4.22 (q, 2, J = 7 Hz, COOCH₂), 5.07, 3.18 and 2.20 ( 3 m, 4 ring tautomers), 2.00 (br m, 2, CH₂CH=CH₂), and 1.28 ppm (br m 20, CH(CH₂)₈CH₂ and CH₃).

EXAMPLE 16

In Example 16, ethyl 3-bromo-6-(10-undecenyl)-β-dihydroresorcylate is made by the following general reaction wherein X = 9:

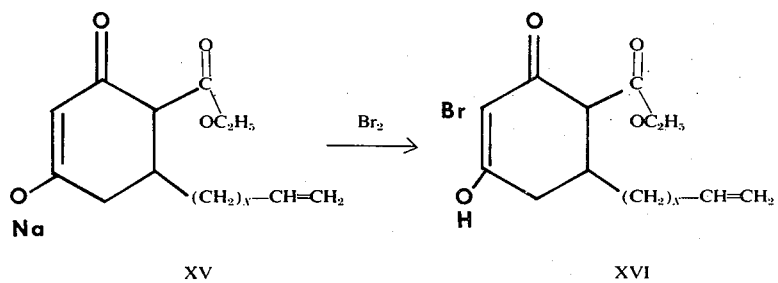

XV  →  XVI

Ethyl 3-bromo-6-(10-undecenyl)-β-dihydroresorcylate XVI

A solution prepared from 15.18 g, 0.0950 mol, of bromine and 51.5 g, 0.500 mol, of sodium bromide and 200 ml of water was added dropwise over 6 hr to a rapidly stirred one of 34.00 g, 0.0950 mol, of XV in 800 ml of water that was held at 0°. The color of the bromine solution was discharged as it was added, and a white solid precipitated. It was collected on a filter, and then was dissolved in 200 ml of ether. The ether solution was washed with water (3 × 75 ml), and briefly dried (MgSO₄). This solvent was evaporated, and the residue was recrystallized from 200 ml of ether to give 26.10 g, 0.0627 mol, (66%) of white XVI: mp 78°–80°; nmr (CDCl₃, TMS) δ7.86 (s, ca. 1, 4-OH hydroxyl), 5.72, 4.92 and 4.88 (3 m, 3, CH=CH₂), 4.22 (q, 2, J = 7 Hz, COOCH₂), 3.35, 2.72 and 2.43 (3 m, ca. 3, ring CH of tautomers), 2.06 (br m, 2, CH₂CH=CH₂), and 1.30 ppm (br m, 20, CH(CH₂)₈CH₂ and CH₃).

Anal. Calcd. for C₂₀H₃₁O₄Br: C, 57.8; H, 7.5; Br. 19.3. Found: C, 57.4: H, 7.5; Br. 19.6.

In Example 16, the temperature at which the reaction of bromine with Compound XV is allowed to occur is kept at 0°C in order to minimize the reaction of bromine with the double bond in the side chain of the compound. Temperatures up to 25°C could be used for this reaction but 0°C is preferred. A lower temperature limit of about −10°C is set since the rate of the desired reaction becomes too low at temperatures much below −10°C. The aqueous reaction mixture would probably freeze solid below −10°C.

EXAMPLE 17

Example 17 shows the preparation of ethyl 6-(10-undecenyl)-β-resorcylate by the following general reactions wherein X = 9:

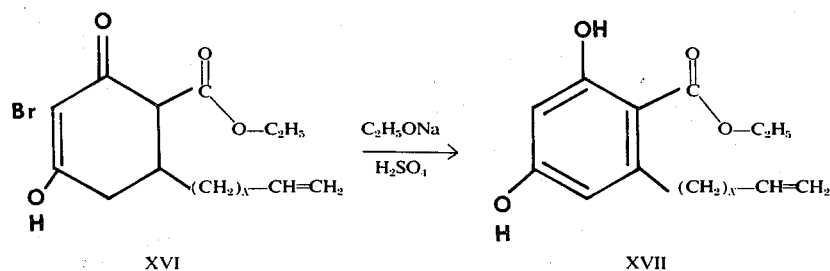

XVI  →  XVII

Ethyl 6-(10-undecenyl)-β-resorcylate XVII

A sodium ethoxide solution was prepared from 12.10 g, 0.527 g-atom, of sodium in 300 ml of anhydrous ethanol, 48.49 g, 0.117 mol of XVI was added to it, and the mixture was held at reflux under nitrogen for 4 hr. About 200 ml of ethanol was evaporated. The residual mixture was held at 0° while 400 ml of water was added to it, and then it was acidified with 6 N sulfuric acid. It was extracted with ether (3 × 200 ml) and the extract was washed with water (4 × 200 ml) until these washings were neutral to pH paper. The resulting orange solution was decolorized with charcoal, and the ether was evaporated to yield 37.06 g, 0.111 mol, (95%) of crude product. Dry column chromatography (750 g Silica Gel H, 10% ethyl ether in methylene chloride) and the recrystallization of appropriate fractions from ligroin (bp 60°–68°) gave 22.7 g, 0.0680 mol, (58%) of pure XVII: mp 55.5°–66.5°; nmr (CDCl$_3$, TMS) δ11.92 (s, 1, 2-O$\underline{H}$), 7.64 (br s, 1, 4-O$\underline{H}$), 6.33 and 6.30 (2 d, 2, J = 2 Hz, aromatic C$\underline{H}$), 5.72 4.92 and 4.88 (3 m, 3, C$\underline{H}$=C$\underline{H}_2$), 4.40 (q, 2, J = 7 Hz, COOC$\underline{H}_2$), 2.84 (t, 2, J = 6 Hz, ArC$\underline{H}_2$), 2.03 (m, 2, C$\underline{H}_2$CH=CH$_2$), 1.40 (t, 3, J = 7 Hz, C$\underline{H}_3$), and 1.32 ppm (m, 14, CH$_2$(C$\underline{H}_2$)$_7$CH$_2$).

Anal. Calcd. for C$_{20}$H$_{30}$O$_4$: C, 71.8; H, 9.0. Found: C, 71.5; H, 8.8.

In Example 17 the de-hydrobromination of compound XVI can be effected at temperatures in the range of 60°–120°C but a temperature near 80°C is preferred. At a temperature of 80°C the rate of de-hydrobromination is reasonably fast.

The de-hydrobromination step could be carried out in a menstruum of an alcohol other than ethanol, for example methanol or butanol.

EXAMPLE 18

Example 18 illustrates the preparation of ethyl 6-(10-undecenyl)-β-resorcylate dibenzyl ether by the following general reaction wherein X = 9:

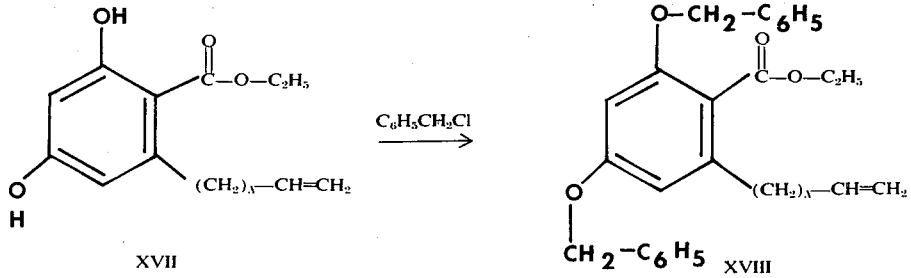

Ethyl 6-(10-undecenyl)-β-resorcylate dibenzyl ether XVIII

A reaction mixture containing 20.00 g, 0.0598 mol, of XVII, 40 g of anhydrous potassium carbonate, and 20.0 ml, 0.174 mol, of benzyl chloride in 300 ml of dry dimethyl sulfoxide was stirred and heated on a steam bath for 6 hr. Then 1.0 l. of water was added to it, and the oil that separated was extracted with 1.0 l. of a solution of 50% ether in pentane. The extract was washed with water (8 × 100 ml), and dried (MgSO$_4$). Evaporation under vacuum gave 28.0 g, 0.0543 mol, (91%) of XVIII with the expected nmr spectrum: nmr (CDCl$_3$; TMS) δ7.24 (m, 10, C$_6$$\underline{H}_5$), 6.41 (s, 2, aromatic C$\underline{H}$), 5.72, 4.92 and 4.88 (3 m, 3, C$\underline{H}$=C$\underline{H}_2$), 4.90, 4.87 (2 s, 4, C$_6$H$_5$C$\underline{H}_2$), 4.26 (q, 2, J = 7 Hz, COOC$\underline{H}_2$), 2.58 (t, 2, J = 6 Hz, ArC$\underline{H}_2$), 1.97 (m, 2, C$\underline{H}_2$CH=CH$_2$), 1.28 (br m, 14, CH$_2$(C$\underline{H}_2$)$_7$CH$_2$), and 1.18 ppm (t, 3, J = 7 Hz, C$\underline{H}_3$).

EXAMPLE 19

Example 19 exhibits the preparation of ethyl 2,4-bis-(benzyloxy)-6-(10-hydroxyundecyl)-benzoate by the following general reactions wherein X = 9:

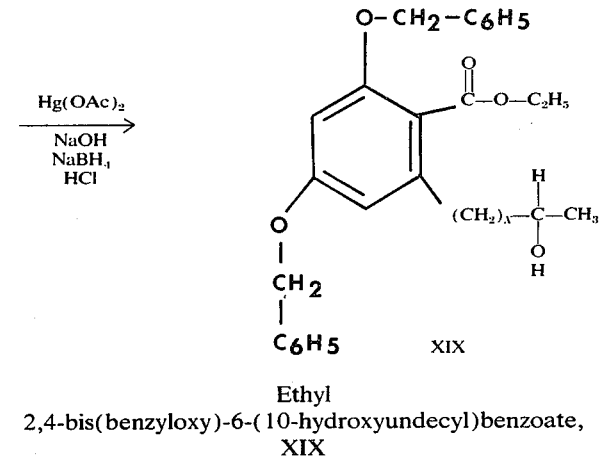

Ethyl 2,4-bis(benzyloxy)-6-(10-hydroxyundecyl)benzoate, XIX

A solution of 10.28 g, 0.0202 mol, of XVIII in 300 ml of tetrahydrofuran was added to a stirred one of 63.74 g, 0.200 mol, of mercuric acetate in 200 ml of water. After 48 hr at 25°, 240 ml of 3 N sodium hydroxide was added and stirring was continued for another 30 min. Then 4.80 g, 0.127 mol, of sodium borohydride in 200 ml of 3 N sodium hydroxide solution was added, and stirring was maintained for 30 min. The reaction mixture was held at 0° while it was slowly acidified with dilute hydrochloric acid. The oil that separated was extracted with ether (3 × 200 ml), and this extract was washed with water (3 × 150 ml) and dried (MgSO$_4$). The semi-solid residue that remained when the extract was evaporated in a vacuum rotary evaporator (Rinco) was purified by dry column chromatography (Silica Gel H, 10% ethyl ether in methylene chloride) to give 6.40 g, 0.0119 mol, (59%) of XIX: nmr (CDCl$_3$, TMS)

δ7.28 (m, 10, C₆H₅), 6.42 (s, 2, aromatic C$\underline{H}$), 4.92 and 4.89 (2, s, 4, C₆H₅C$\underline{H}$₂O), 4.80 (br s, 1, O$\underline{H}$), 4.26 (q, 2, J = 7 Hz, COOC$\underline{H}$₂), 3.68 (br m, 1, CH₃C$\underline{H}$OH), 2.60 (t, 2, J = 6 Hz, ArC$\underline{H}$₂), 1.31 (br m, 16, CH₂(C$\underline{H}$₂)₈CH), 1.24 (t, 3, J = 7 Hz, CH₂C$\underline{H}$₃), and 1.11 ppm (d, 3, J = 6 Hz, CHC$\underline{H}$₃).

The reaction of the olefinic compound XVII with mercuric acetate has been carried out at 25°C in Example 19. The temperature limits for this reaction are 0° and 60°C. Below 0°C the reaction is too slow and above 60°C unwanted side reactions occur.

EXAMPLE 20

In Example 20, (R,S)-zearalane dibenzyl ether and dimeric dilactone tetrabenzyl ether are made by the following general reaction wherein X = 9:

Its thin layer chromatography indicated three products (Eastman silica gel with 9 CH₂Cl₂: 1 ether R$_f$ 0.22, 0.53 and 0.78; and with 7 cyclohexane: 1 ethanol, R$_f$ 0.43, 0.21 and 0.09). With dry column chromatography (the CH₂Cl₂-ether solvent mixture) 3,2 g (0.0066 mol, 44%) of the material of R$_f$ 0.78 was isolated. Its recrystallization from 50% ethyl ether in pentane gave 2.6 g of a crystalline solid: mp 179°–180°; nmr (CDCl₃, TMS) δ7.27 (s, 10, C₆H₅CH₂—), 6.42 (s, 2, ArC$\underline{H}$), 5.08 (br m, 1, —COOC$\underline{H}$), 5.00 and 4.97 (2 s, 4, C₆H₅C$\underline{H}$₂), 2.57 (br m, 2, ArC$\underline{H}$₂), 1.30 (br m, 16, —CH₂(C$\underline{H}$₂)₈CH), and 1.12 ppm (d, 3, J = 7.0 Hz, C$\underline{H}$₃CH).

Anal. Calcd. for C₃₂H₃₈O₄: C, 78.98; H, 7.87. Found: C, 78.64; H, 7.93.

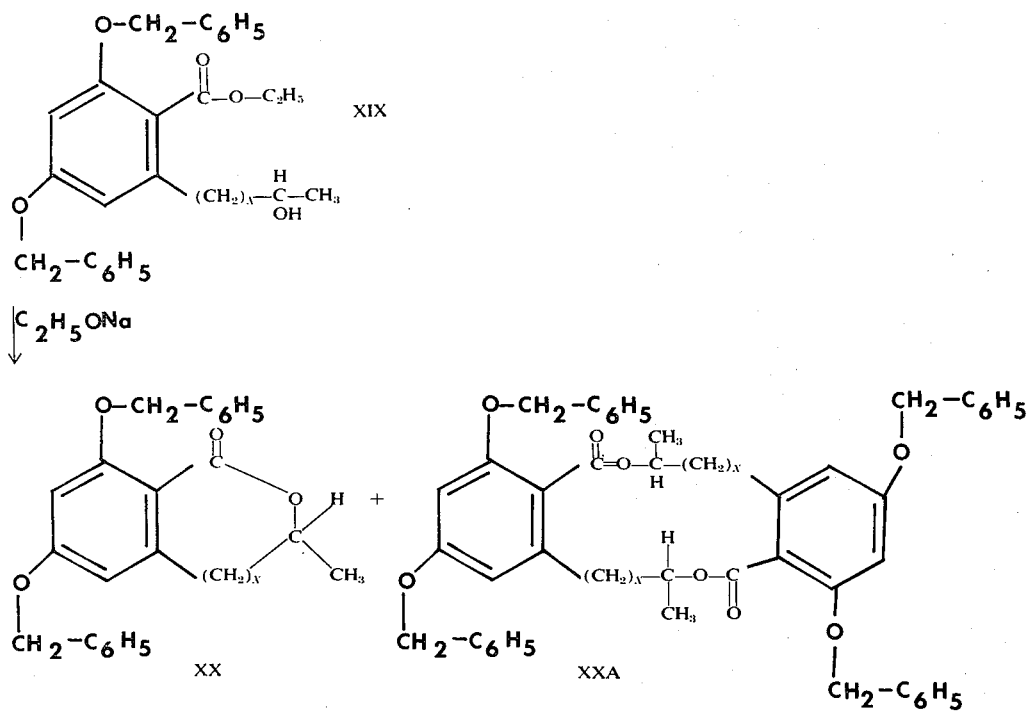

(R,S)-zearalane dibenzyl ether, XX, and dimeric dilactone tetrabenzyl ether, XX A.

A solution of 8.50 g (0.016 mol) of XIX in 900 ml of dry toluene was added to 75 ml of sodium ethoxide in ethanol prepared with 0.736 g (0.0320 g-atom) of sodium. With a fractionating column, an ethanol-toluene azeotrope was distilled under nitrogen. Slow distillation of toluene with some ethanol was continued for 36 hr until 50 ml of additional distillate was collected. After the reaction mixture had cooled, 500 ml of water was added, and then it was acidified with 3N hydrochloric acid. The toluene solution was separated, and the remaining aqueous one was extracted with ether (3 × 20 ml). The combined organic solution was washed with a saturated solution of sodium chloride in water, and dried (MgSO₄). Its evaporation in a vacuum rotary evaporator (Rinco) gave 7.7 g of yellow semisolid product. Its nmr spectrum indicated that conversion was complete since the quartet (δ4.27, CH₃C$\underline{H}$₂O—) of the ethoxycarbonyl function of XIX had disappeared.

The mass spectrum of this solid product showed that it was a mixture of the dimeric lactone tetrabenzyl ether, XX A, (parent ion at 972, and fragments due to its loss of benzyl groups at 881, 790, 699 and 608) and XX (parent ion at 486).

The hydrogenation data shown in Example 21 below confirm the above conclusions.

In Example 20, ring closure of compound XIX is effected by heating the compound in a dry menstruum which is initially ethanol-toluene and which becomes toluene in the latter stages of the operation at a temperature in the range 75°–110°C. This temperature range could be lowered somewhat but the reaction becomes very slow below 60°C. Temperatures above 110°C can be used but at temperatures much beyond 120°C undesirable reactions occur.

EXAMPLE 21

Example 21 shows the preparation of (R,S)-zearalane and its dimeric dilactone by the following general reactions wherein X = 9:

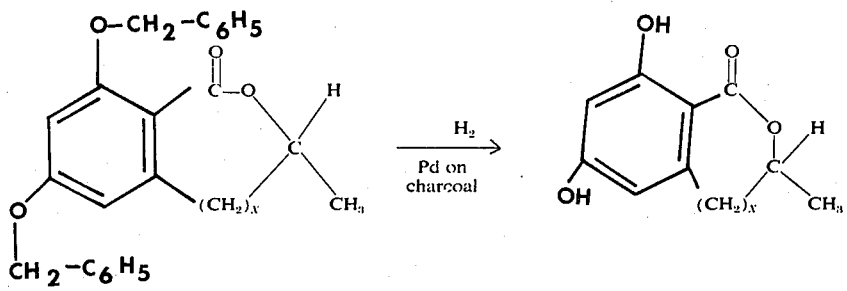

XX

XXI

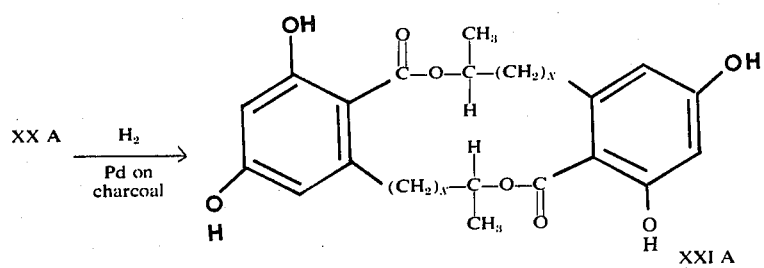

XX A

XXI A

A mixture containing 2.0 g of the crystalline solid (mp 179°–180°) produced in Example 20, 50 ml of ethyl acetate, and 20 ml of ethanol with 1 g of 5% palladium on charcoal and few drops of triethylamine was stirred at 25° under 760 mm of hydrogen. After 202 ml (25°) of it had been consumed, its absorption stopped. The catalyst was removed on a filter, and the filtrate was evaporated to give a semisolid mixture that contained two major components (Tlc as before, $R_f$ 0.64 and 0.22). They were separated by the usual dry column chromatography. The first fractions ($R_f$ 0.64) were combined and evaporated to give 0.22 g (0.00072 mol, 18%) of crude XXI. It was recrystallized from ether-pentane to give pure XXI (white needles): mp 146°–148°; nmr ($CD_3COCD_3$, TMS) δ12.02 (s, 1, 2-O$\underline{H}$), 8.38 (br s, 1, 4-O$\underline{H}$), 6.31 (s, 2, Ar$C\underline{H}$), 5.22 (m, 1, COO$C\underline{H}$), 3.32 (mA of AB, 1, Ar$C\underline{H}_2$—), 2.48 (mB of AB, 1, Ar$C\underline{H}_2$—), 1.40 (m, 16, —$CH_2(\underline{CH_2})_8C$-$H_2$—), and 1.38 ppm (d, 3, $\underline{CH}_3CH$). This nmr spectrum is identical with that of S-zearalane. The melting point of XXI is the same as that of (R,S)-zearalane previously prepared (Canadian Patent No. 807,669) and the melting point of the mixture is not depressed. Further fractions eluted at first contained mixtures of XXI and XXI A ($R_f$ 0.22). Finally, the eluate contained only the latter. Workup of these fractions gave 0.45 g (0.00073 mol, 36%) of crude XXI A. It was recrystallized from acetone to give XXI A: mp 198°–199°; nmr (DMSO, TMS) δ11.78 (s, 1, 2-O$\underline{H}$), 11.65 (s, 1, 2'—O$\underline{H}$), 9.83 (s, 2, 4 and 4'—O$\underline{H}$), 6.22 (s, 4, Ar$C\underline{H}$), 5.15 (m, 2, COO$C\underline{H}$), 2.98 (m A of AB, 2, Ar$C\underline{H}_2$—), 2.58 (m B of AB, 2, Ar$C\underline{H}_2$—), 1.32 (d, G, J = 5 Hz, $C\underline{H}_3CH$), and 1.31 ppm (m, 32, —$CH_2(\underline{CH}_2)_8CH_2$—); mass spectrum 70 eV) m/e (relative intensity) 612 (0.4), 594 (0.4), 576 (0.2), 550 (0.4), 532 (0.5), 423 (0.4), 407 (0.6), 306 (5), 289 (10), 178 (7), 177 (8), 168 (42), 164 (7), 163 (15), 150 (19), 137 (14), 124 (100), 69 (11), 55 (26), 44 (20), 41 (29).

Anal. Calcd. for $C_{36}H_{52}O_8$: C, 70.6; H, 8.6. Found: C, 70.3; H, 8.3.

EXAMPLE 22

In Example 22, the compound 5-hexenal, XXII, is prepared by the pyrolysis of 3-hydroxy-1,5-hexadiene at a temperature of 380°C.

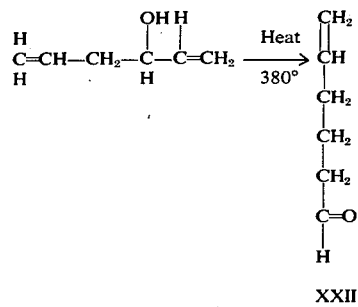

5Hexenal, XXII 190 g, 1.94 mol, of 3-hydroxy-1,5-hexadiene was slowly distilled through a 50 cm column packed with 3 mm Pyrex helices maintained at 380°. Fractional distillation of the pyrolysis mixture gave 111.2 g, 1.14 mol (59%), of 5-hexenal: bp 57.5° (57 mm). The boiling point of this product is given as 120°–121° (760 mm) by Viola and Levassuer, J. Amer. Chem. Soc. 87, 1150 (1965).

EXAMPLE 23

Example 23 gives the details of a method for preparing 2,7-octadienoic acid, XXIII, by the reaction of 5-hexenal, XXXII, with malonic acid.

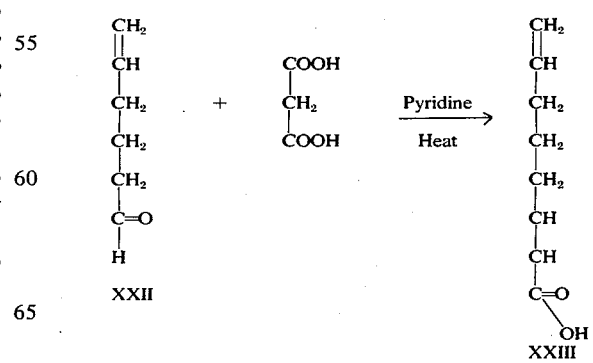

2,7-Octadienoic acid XIII

A reaction mixture containing 76.9 g, 0.784 mol, 5-hexenal XXII, 90.0 g, 0.865 mol, of malonic acid, and 145 ml of pyridine was stirred at 25° under nitrogen for 60 hr. An additional 45.0 g of malonic acid was added to it, and stirring was continued for 24 hr at 25°. It was then heated on a steam bath until carbon dioxide evolution ceased (20 hr). Water (145 ml) was added to it, and resulting mixture was extracted with ether (3 × 200 ml). The extract was washed with dilute hydrochloric acid (2 N, 2 × 50 ml), water (2 × 50 ml), and dried ($Na_2SO_4$). Fractional distillation gave 83.0 g, 0.593 mol (76 percent), of XXIII: bp 86°–87° (0.15 mm); nmr ($CDCl_3$, TMS) δ12.34 (s, 1, COO$\underline{H}$), 7.26 and 6.98 (2 t, 1, $J_{AB}$ = 15.7 Hz, $J_{AX}$ = 7 Hz, $CH_2C\underline{H}$=CH), 5.97 and 5.70 (2 t, 1, $J_{AB}$ = 15.7 Hz, $J_{BX}$ = 1 Hz, (C$\underline{H}$COO), 5.72, 4.92 and 4.88 (3 m, 3, C$\underline{H}$=C$\underline{H}_2$), 2.12 (br m, 4, C$\underline{H}_2$CH=CH), and 1.60 ppm (br m, 2, $CH_2\underline{CH_2}CH_2$).

Anal. Calcd. for $C_8H_{12}O_2$: C, 68.6, H, 8.6. Found: C, 68.6; H, 8.7.

Methyl 2,7-octadienoate XXIV

A solution of diazomethane in ether was added to a cold (0°) solution of 83.0 g, 0.592 mol, of XXIII in 200 ml of ether until a yellow color persisted. Evaporation of the reaction mixture gave 90.3 g of crude XXIV that was fractionally distilled to give 80.2 g, 0.520 mol (88 percent) of XXIV: bp 44°–45° (0.70 mm); nmr ($CDCl_3$, TMS) δ7.04 and 6.78 (2 t, 1, $J_{AB}$ = 15.7 Hz, $J_{AX}$ = 7 Hz, $CH_2C\underline{H}$=CH), 5.87 and 5.61 (2 t, 1, $J_{AB}$ = 15.7 Hz, $J_{BX}$ = 1 Hz, C$\underline{H}$CO), 5.72, 4.92 and 4.88 (3 m, 3, C$\underline{H}$=C$\underline{H}_2$), 3.67 (s, 3, (C$\underline{H}_3$), 2.12 (br m, 4, C$\underline{H}_2$CH=CH), and 1.58 ppm (br m, 2, $\underline{CH_2}CH_2CH_2$).

Anal. Calcd. for $C_9H_{14}O_2$: C, 70.2; H, 9.1. Found: C, 70.1; H, 9.2.

EXAMPLE 25

Example 25 illustrates the preparation of the sodium salt of ethyl 6-(4-pentenyl)-β-dihydroresorcylate by the following general reaction wherein X = 3:

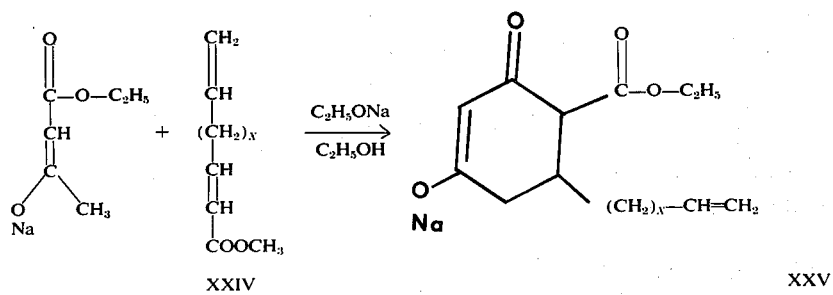

EXAMPLE 24

Example 24 exhibits the preparation of methyl 2,7-octadienoate by the following general reaction wherein X = 3:

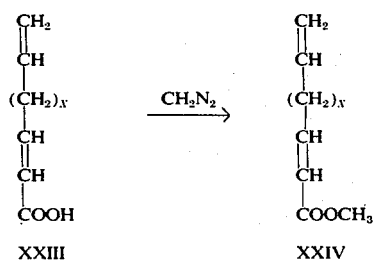

Sodium salt of ethyl 6-(4-pentenyl)-β-dihydroresorcylate, XXV 81.4 g, 0.626 mol, of freshly-distilled ethyl acetoacetate was added dropwise to a stirred solution of sodium ethoxide prepared from 14.4 g, 0.626 g-atom of sodium and 200 ml of ethanol under nitrogen. The resulting solution was held at reflux while 80.2 g, 0.521 mol, of XXIV was added dropwise, and then such heating was continued with mechanical stirring for 22 hr. The solid that precipitated during the reaction and while the mixture was cooled to 0° was removed on a filter, and it was washed with ether to give 110.80g, 0.404 mol (78 percent), of white XXV: nmr ($D_2O$, DSS, integration of some ring hydrogen atoms not given since they exchanged) δ5.72, 4.92 and 4.88 (3 m, 3, C$\underline{H}_2$=C$\underline{H}$), 4.22 (q, 2, J = 7 Hz, COOC$\underline{H}_2$), 3.18 (d, J = 10 Hz, $\underline{H}$CCOO), 2.20 (m, OC$\underline{CH_2}$CH), 2.00

(br m, 2, C$\underline{H}_2$CH=CH$_2$), 1.33 (br m, 5, CH(C$\underline{H}_2$)$_2$CH$_2$), and 1.26 ppm (t, 3, J = 7 Hz, C$\underline{H}_3$).

Then a solution of 3.00 g, 0.0109 mol, of XXV in 50 ml of water was acidified with 3 N hydrochloric acid and the resulting mixture was extracted with ether (4 × 25 ml). The extract was washed with water (4 × 25 ml), dried (MgSO$_4$), and evaporated in a vacuum rotary evaporator (Rinco) to give a residue which crystallized from ligroin (bp 60°–68°) to give 2.37 g, 0.00942 mol (86 percent), of ethyl 6-(4-pentenyl)-β-dihydroresorcylate XXV A: mp 72.5°–73.5°; nmr (CDCl$_3$, TMS) δ12.32 (s, 0.2, 2—O$\underline{H}$), 9.75 (s, 0.8, 4—O$\underline{H}$), 5.72, 4.92 and 4.88 (3 m, 3, C$\underline{H}$=C$\underline{H}_2$), 5.52 (s, 0.8, 3—C$\underline{H}$), 4.29 and 4.22 (2 q, 2, J = 7 Hz, COOC$\underline{H}_2$), 3.12 (s, 0.4, 3—C$\underline{H}_2$), 3.15 (d, 0.8, J = 10 Hz, 1—C$\underline{H}$), 2.45 (m, ca. 2, 5—C$\underline{H}_2$), 2.06 (br m, 2, C$\underline{H}_2$CH=CH$_2$), 1.36 (br m, 5, C$\underline{H}$(C$\underline{H}_2$)$_2$CH$_2$), and 1.29 ppm (t, 3, J = 7 Hz, C$\underline{H}_3$).

Anal. Calcd. for C$_{14}$H$_{20}$O$_4$: C, 66.7; H, 8.0. Found: C, 66.7; H, 8.0.

EXAMPLE 26

Example 26 shows the preparation of the sodium salt of methyl 6-(4-pentenyl)-β-dihydroresorcylate by the following general reaction wherein X = 3:

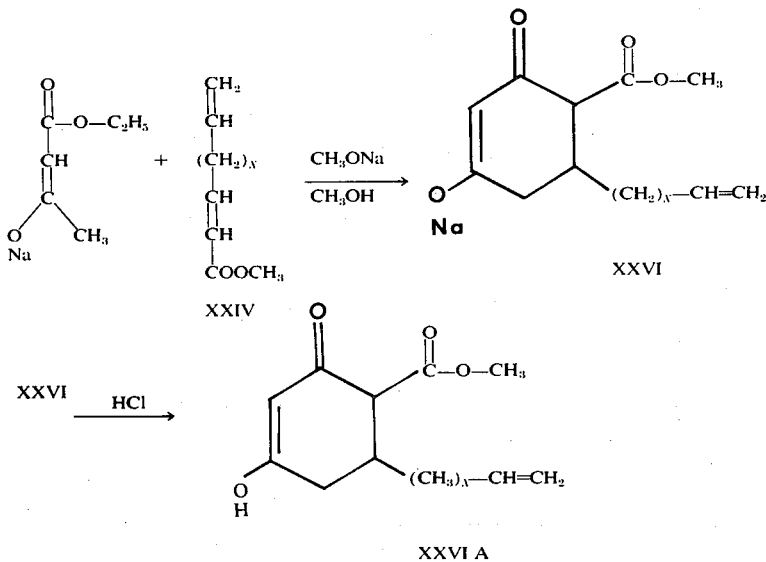

Sodium salt of methyl 6-(4-pentenyl)-β-dihydroresorcylate, XXVI

The reaction mixture was prepared by dropwise addition of 70.7 g, 0.598 mol, of ethyl acetoacetate to a solution of 32.3 g, 0.598 mol, of sodium methoxide in 130 ml of methanol stirred under nitrogen, and then 74.2 g, 0.482 mol of XXIV was also added dropwise. It was held at reflux with mechanical stirring for 20 hr. About 60 ml of its solvent was removed under vacuum, and it was cooled to 0°. A precipitate that formed during the above was removed on a filter and washed with ether until it was white to give 84.7 g, 0.326 mol (68 percent), of XXVI: nmr (D$_2$O, DSS, again exchange of hydrogen atoms on the ring occurred) δ5.72, 4.92 and 4.88 (3 m, 3, C$\underline{H}$=C$\underline{H}_2$), 5.07 (s, OCC$\underline{H}$CO), 3.18 (d, J = 10 Hz, HCCOO), 2.20 (m, OCC$\underline{H}_2$CH), 2.00 (br m, 2, C$\underline{H}_2$CH=CH$_2$), and 1.33 ppm (br m, 5, C$\underline{H}$(C$\underline{H}_2$)$_2$CH$_2$). The nmr spectrum is nearly the same as XXV, except for the alkoxy absorptions.

EXAMPLE 27

In Example 27, methyl 3-bromo-6-(4-pentenyl)-β-dihydroresorcylate is made by the following general reaction wherein X = 3:

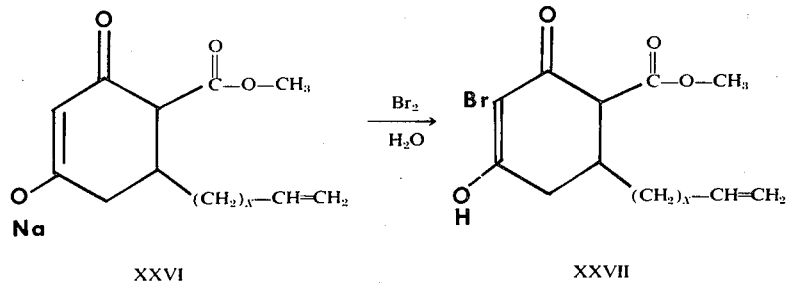

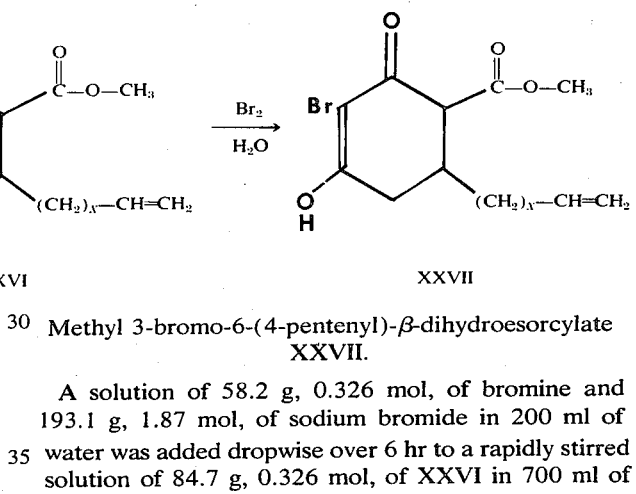

Methyl 3-bromo-6-(4-pentenyl)-β-dihydroesorcylate XXVII.

A solution of 58.2 g, 0.326 mol, of bromine and 193.1 g, 1.87 mol, of sodium bromide in 200 ml of water was added dropwise over 6 hr to a rapidly stirred solution of 84.7 g, 0.326 mol, of XXVI in 700 ml of water cooled to 0°. After 30 min. the solid that had precipitated was removed by filtration. It was dissolved in 200 ml of ether, and the resulting solution was washed with water (3 × 150 ml), and briefly dried (MgSO$_4$). It was evaporated in a vacuum rotary evaporator (Rinco, 25°), and the residue was recrystallized from 200 ml of ether and pentane to give 70.4 g, 0.222 mol (68 percent), of white crystalline XXVII: mp 91°–93°; nmr (CDCl$_3$, TMS) δ8.10 (s, 1, 4—O$\underline{H}$), 5.72, 4.92 and 4.88 (3 m, 3, CH=CH$_2$ ), 3.77 (s, 3, CH$_3$), 3.35 (d, 1, J = 10 Hz, HCCOO), 2.72 (dd, 1, J$_{AB}$ = 20.4 Hz, J$_{AX}$ = 11.0 Hz, OCCH$_2$CH), 2.43 (dd, 1, J$_{AB}$ = 20.4 Hz, J$_{BX}$ = 8.6 Hz, OCCH$_2$CH), 2.06 (br m, 2, CH$_2$CH=CH$_2$), and 1.45 ppm (br m, 5, CH(CH$_2$)$_2$CH$_2$).

Anal. Calcd. for C$_{13}$H$_{17}$O$_3$Br: C, 49.2; H, 5.4; Br, 25.2. Found: C, 48.9; H, 5.7; Br, 25.2.

In Example 27, the temperature at which the reaction of bromine with Compound XXVI is allowed to occur is kept at 0°C in order to minimize the reaction of bromine with the double bond in the side chain of the compound. Temperatures up to 25°C could be used for this reaction but 0°C is preferred. A lower temperature limit of about −10°C is set since the rate of the desired reaction becomes too low at temperatures much below −10°C, and the reaction mixture would tend to freeze solid at temperatures below −10°C.

d, 2, J = 2 Hz, aromatic CH), 5.72, 4.92 and 4.88 (3 m, 3, CH=CH$_2$), 3.82 (s, 3, CH$_3$), 2.82 (t, 2, J = 7 Hz, ArCH$_2$), 2.08 (br m, 2, CH$_2$CH=CH$_2$), and 1.64 ppm (br m, 2, CH$_2$CH$_2$CH$_2$).

Anal. Calcd. for C$_{13}$H$_{16}$O$_4$: C, 66.2; H, 6.8. Found: C, 66.1; H, 6.7.

In Example 28 the de-hydrobromination of compound XXVII can be effected at temperatures in the range 60°–120°C but a temperature near 65°C is preferred. At a temperature of 80°C the rate of de-hydrobromination is reasonably fast.

The de-hydrobromination step could be carried out in a menstruum of an alcohol other than methanol, for example ethanol or butanol.

EXAMPLE 29

In Example 29, ethyl 6-(4-pentenyl)-β-resorcylate is prepared by the following general reaction wherein X = 3:

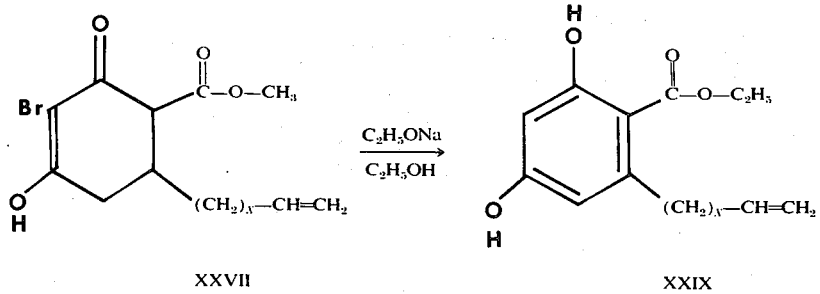

XXVII     XXIX

EXAMPLE 28

In Example 28, methyl 6-(4-pentenyl)-β-resorcylate is produced by the following general reactions wherein X = 3:

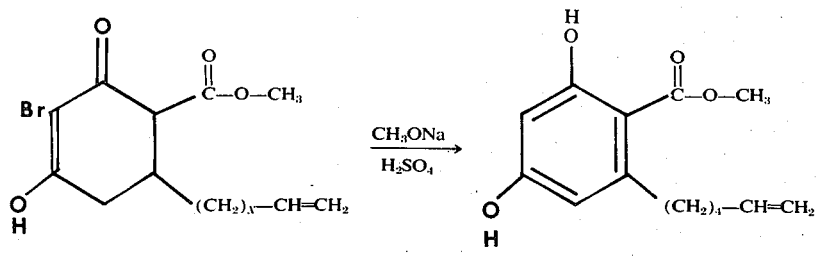

XXVII     XXVIII

Methyl 6-(4-pentenyl)-β-resorcylate XXVIII

A solution of 21.5 g, 0.0678 mol, of XXVII and sodium methoxide (prepared from 15.6 g, 0.678 g-atom of sodium) in 350 ml of anhydrous methanol was maintained at reflux under nitrogen for 9 hr. Then 200 ml of methanol was evaporated under vacuum. The reaction mixture was held at 0° while enough water to give 400 ml of the mixture was added to it. It was acidified with sulfuric acid (6 N), and extracted with ether (3 × 200 ml). The extract was washed with water (4 × 200 ml), and it was decolorized with charcoal, and evaporated (Rinco) to yield 14.9 g, 0.0632 mol (93 percent), of crude XXVIII. Purification by dry column chromatography (300 g, Silica Gel H, 10 percent ethyl ether in methylene chloride) yielded fractions that gave product that was recrystallized from ligroin (60°–68°) to give 8.82 g, 0.373 mol (55 percent), of pure XXVIII: mp 55°–56°; nmr (CDCl$_3$, TMS) δ11.83 (s, 1, hydrogen bonded 2—OH), 6.90 (s, 1, 4—OH), 6.33 and 6.30 (2

Ethyl 6-(4-pentenyl)-β-resorcylate XXIX

A solution containing 19.33 g, 0.0610 mol, of XXVII, and sodium ethoxide (prepared from 9.00 g, 0.391 g-atom of sodium and in the 250 ml of ethanol) was held at reflux under nitrogen for 6 hr, and then it was evaporated under vacuum until its volume was about 100 ml. It was diluted with water to 300 ml, and acidified with sulfuric acid (6 N) while it was held at 0°. The resulting mixture was extracted with ether (3 × 150 ml). The extract was then washed with water (4 × 100 ml), decolorized with charcoal and evaporated in a vacuum rotary evaporator (Rinco) to yield 14.0 g, 0.0562 mol (92 percent), of crude XXIX. Dry column chromatography (300 g Silica Gel H, 10 percent ethyl ether in methylene chloride) gave 9.15 g, 0.0366 mol (60 percent), of XXIX: nmr (CDCl$_3$, TMS) δ11.95 (s, 1, 2—OH) 7.42 (s, 1, 4—OH), 6.33 and 6.30 (2 d, 2, J = 2 Hz, aromatic CH), 5.72, 4.92 and 4.88 (3 m, 3, CH=CH$_2$), 4.40 (q, 2, J = 7 Hz, COOCH$_2$), 2.85 (t, 2, J = 7 Hz, ArCH$_2$), 2.03 (m, 2, CH$_2$CH=CH$_2$), 1.64 (br m, 2, CH$_2$CH$_2$CH$_2$), and 1.40 ppm (t, 3, J = 7 Hz, CH$_3$). Except for the expected differences, this nmr spectrum is the same as that of XXVIII.

EXAMPLE 30

In Example 30, ethyl 6-(4-pentenyl)-β-resorcylate dibenzyl ether is formed by the following general reaction wherein X = 3:

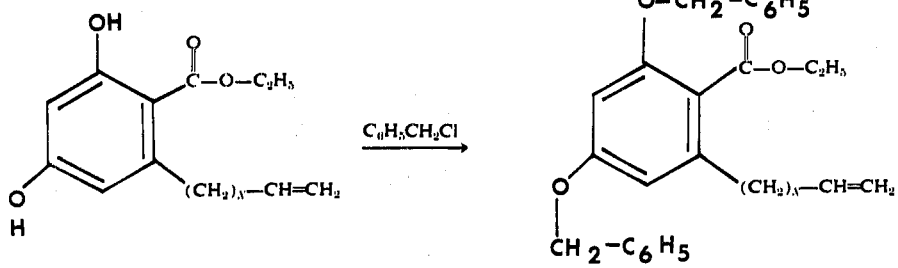

XXIX → XXX

Ethyl 6-(4-pentenyl)-β-resorcylate dibenzyl ether
XXX

A mixture of 31.5 g, 0.126 mol, of XXIX, 60.5 g of anhydrous potassium carbonate, and 31.5 ml of 0.274 mol, of benzyl chloride in 300 ml of dimethyl sulfoxide was stirred on a steam bath for 6 hr. 1.0 l. of water was added to it while it was stirred, and then it was held overnight at −15°. The product that had crystallized was collected on a filter, and it was recrystallized from a mixture of ethyl ether and ligroin (bp 60°–68°) to give 45.5 g, 0.106 mol (84 percent), of XXX: mp 49°–61°; nmr (CDCl$_3$, TMS) δ7.32 (m, 10, C$_6$H$_5$), 6.44 (s, 2, aromatic CH), 5.72, 4.92 and 4.88 (3 m, 3, CH=CH$_2$), 4.98 and 4.96 (2 s, 4, C$_6$H$_5$CH$_2$), 4.28 (q, 2, J = 7 Hz, COOCH$_2$), 2.58 (t, 2, J = 7 Hz, ArCH$_2$), 2.00 (m, 2, CH$_2$CH=CH$_2$), 1.64 (br m, 2, CH$_2$CH$_2$CH$_2$), and 1.23 ppm (t, 3, J = 7 Hz, CH$_3$).

Anal. Calcd. for C$_{28}$H$_{30}$O$_4$: C, 78.2; H, 7.0. Found: C, 78.0; H, 6.9.

EXAMPLE 31

In Example 31, methyl 6-(4-pentenyl)-β-resorcylate dibenzyl ether is made by the following general reaction wherein X = 3:

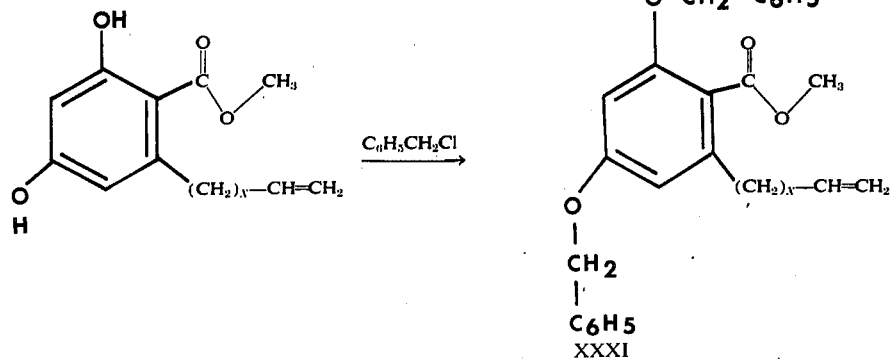

XXVIII → XXXI

Methyl 6-(4-pentenyl)-β-resorcylate dibenzyl ether
XXXI

A mixture of 10.0 g (0.0423 mol) of XXVIII, 11.0 g (0.087 mol) of benzyl chloride, and 20 g of potassium carbonate in 150 ml of dimethyl sulfoxide was heated and stirred at 95° for 5 hr. After the reaction mixture had cooled, 150 ml of water was added to it, and the resulting mixture was extracted with ether (3 × 100 ml). The extract was dried (MgSO$_4$) and evaporated to give 13.0 g (0.0312 mol, 74%) of crude XXXI: nmr (CDCl$_3$, TMS) δ7.28 (s, 10, C$_6$H$_5$CH$_2$), 6.41 (s, 2, ArCH), 5.72, 4.92 and 4.88 (3 m, 3, CH=CH$_2$), 4.91 (s, 4, C$_6$H$_5$CH$_2$), 3.75 (s, 3, CH$_3$O), 2.57 (t, 2, J = 7 Hz, ArCH$_2$), 2.00 (m, 2, CH$_2$CH=CH$_2$), and 2.0–1.6 ppm (m, 2, CH$_2$CH$_2$CH$_2$).

EXAMPLE 32

Example 32 shows the preparation of methyl 2,4-bis(benzyloxy)-6-(4-hydroxypentyl)-benzoate by the following general reactions wherein X = 3:

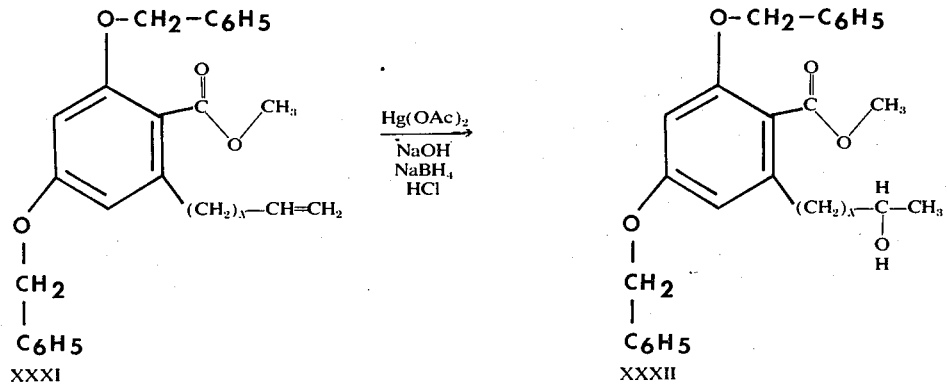

XXXI → XXXII

Methyl 2,4-Bis(benzyloxy)-6-(4-hydroxypentyl)benzoate XXXII

A solution of 8.32 g of XXXI (0.020 mol) in 10 ml of tetrahydrofuran was added to a stirred one of 6.38 g (0.020 mol) of mercuric acetate in 100 ml of water and 30 ml of tetrahydrofuran at 25°. The initial orange color faded to pale yellow in 20 min, but the mixture was stirred at 25° for another 12 hr.

Then it was cooled to 10°, and 3.0 g (0.075 mol) of sodium hydroxide was added and it was stirred for 15 min more. Next a solution of 1.89 g (0.05 mol) of sodium borohydride in 100 ml of 3 N-sodium hydroxide was added, and the mixture was stirred for another hour at 10°. Then, 200 ml of ether was added, and the organic layer was separated. The remaining aqueous one was extracted with ether (3 × 100 ml). The ether extract was washed with saturated brine and dried (MgSO$_4$). Evaporation under vacuum gave 8.5 g of a yellow oil. Since its nmr spectrum indicated only a 50% conversion of XXXI into XXXII, the above sequential treatment of the product was repeated. Then dry column chromatography gave 1.5 g (0.0036 mol, 18% recovered) of starting material XXXI and 6.4 g (0.0147 mol, 74%) of XXXII. Recrystallization from ether-pentane gave pure XXXII: mp 61°–62°C, nmr (CDCl$_3$, TMS) δ7.24 (s, 10, C$_6$H$_5$CH$_2$—), 6.39 (s, 2, ArCH), 4.85 (s, 4, C$_6$H$_5$CH$_2$—), 3.71 (s, 3, —OCH$_3$), 3.66 (m, 1, CH$_3$CHOH—), 2.54 (m, 2, ArCH$_2$—), 2.01–1.0 (m, 4, —CH$_2$(CH$_2$)$_2$CHOH), and 1.07 ppm (d, 3, CH$_3$CHOH—).

Anal. Calcd. for C$_{27}$H$_{30}$O$_5$: C, 74.63; H, 6.96. Found: C, 74.78; H, 7.06.

The reaction of the olefinic compound XXXI with mercuric acetate has been carried out at 25°C in Example 32. The temperature limits for this reaction are 0° and 60°C. Below 0°C the reaction is too slow and above 60°C unwanted side reactions occur.

EXAMPLE 33

In Example 33, the dimeric dilactone from 2,4-bis(benzyloxy)-6-(4-hydroxypentyl)-benzoic acid is made by the following general reaction wherein X = 3:

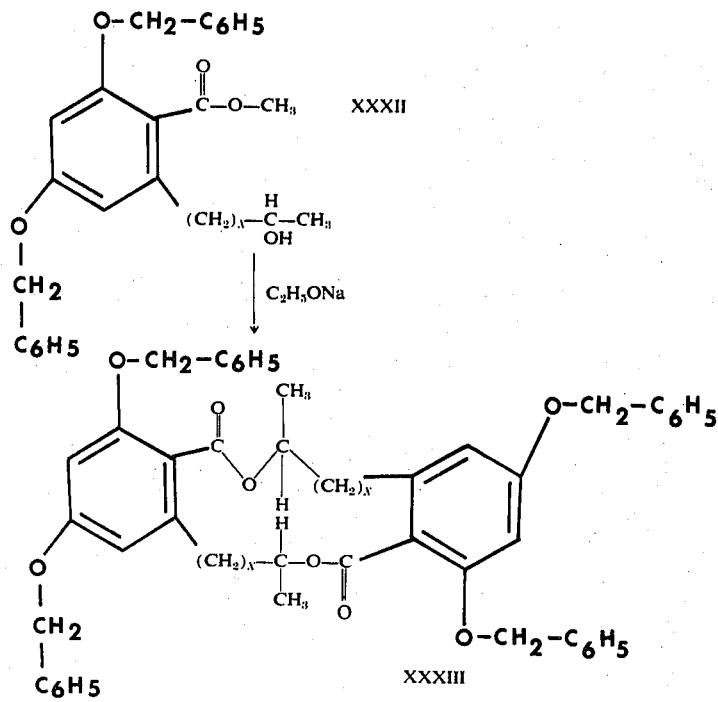

Dimeric dilactone from 2,4-Bis(benzyloxy)-6-(4-hydroxypentyl)-benzoic acid XXXIII A reaction mixture with 6.51 g (0.015 mol) of XXXII, sodium ethoxide solution from 0.69 g of sodium (0.03 g-atom) with 50 ml of ethanol, and 700 ml of toluene (sodium-dried) was distilled until all of the ethanol-toluene azeotrope had been removed. Slow distillation (2 ml/hr) was continued for 36 hr. The mixture was allowed to cool to 25°, and 100 ml of water was added to it. Then 3 N-hydrochloric acid was added until its aqueous phase was acidic. The toluene layer was separated, the aqueous one was extracted with ether (4 × 100 ml), and the combined solution was dried (MgSO$_4$).

Evaporation gave a crude product that appeared to contain monomeric lactone: nmr (CDCl$_3$) δ7.25 (s, 10, C$_6$H$_5$CH$_2$—), 6.39 (s, 2, ArCH), 4.89 (s, 4, C$_6$H$_5$CH$_2$—), 2.67 (m, 2, ArCH$_2$—), 2.0–1.0 (m, 4, —CH$_2$—), and 1.12 ppm (d, 3, CH$_3$CHO). However, the first fractions eluted with the usual dry column chromatography contained only one substance (tlc), and their evaporation gave 3.17 g (0.0039 mol, 53%) of XXXIII: mp 205°–206° from acetone; mass spectrum (70 eV) m/e (relative intensity) 804 (1), 713 (0.5), 403 (1.5), 401 (1), 385 (2.6 ), 295 (4.6), 268 (1.7), 181 (2.3), 91 (100), 65 (4.8).

Anal. Calcd. for C$_{52}$H$_{52}$O$_8$: C, 77.59; H, 6.51. Found: C, 77.33; H, 6.56.

This substance was insoluble in most organic solvents. Initial attempts to effect its hydrogenolysis failed.

In Example 33, ring closure of compound XXXII is effected by heating the compound in a dry menstruum which is initially ethanol-toluene and which becomes toluene in the latter stages of the operation at a temperature in the range 75°–110°C. This temperature range could be lowered somewhat but the reaction becomes very slow below 60°C. Temperatures above 110°C can be used but at temperatures much beyond 120°C undesirable reactions occur.

The process of the present invention as illustrated by the foregoing examples has protected the hydroxyl groups of the resorcylic acid moiety by forming benzyl ethers in compounds VI, VII, VIII, XVIII, XIX, XX, XX A, XXX, XXXI, XXXII, and XXXIII. It will be obvious to anyone skilled in the art that other protecting groups could be used in place of the benzyl groups, for example, methyl, ethyl, butyl, cyclopentyl, cyclohexyl and the like.

It will naturally occur to a skilled organic chemist that various unsaturated aldehydes could be substituted for 10-undecenal in Example 1 and by following the sequence of reactions in Chart I produce a modified norzearalane. It is thus seen that many variations could me made in the large ring (so-called B-ring) by appropriate changes in the starting unsaturated aldehyde. All such obvious modifications are considered to be the full equivalent of the embodiments specifically described herein and to fall within the scope of the invention.

We claim:
1. A compound of the formula

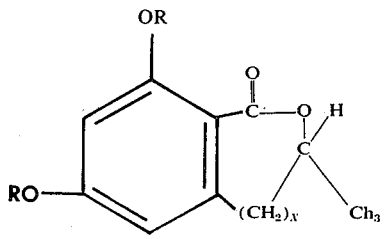

wherein X is an integer from 0 to 7 or 10 to 12 and R is —CH$_2$—C$_6$H$_5$ or H.

2. The compound of claim 1 wherein R is —CH$_2$—C$_6$H$_5$.
3. The compound of claim 2 wherein X is 3.
4. The compound of claim 1 wherein R is H.
5. The compound of claim 4 wherein X is 3.
6. A method for the preparation of a compound of the formula

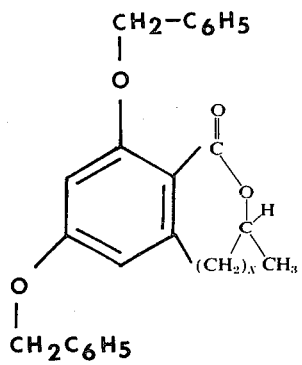

comprising reacting a compound of the formula

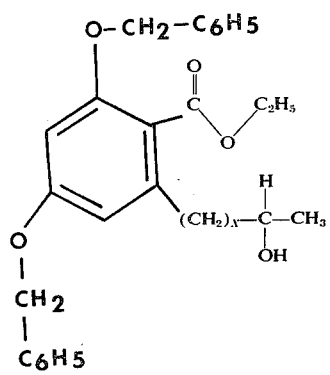

with sodium ethoxide in a menstruum of ethanol and toluene at a temperature in the range 60°–120°C, wherein X is an integer having the value 0 to 12 inclusive.

7. The method of claim 6 wherein the reactants are in high dilution.

8. A method for the preparation of (R,S)-norzearalane dibenzyl ether comprising reacting ethyl 2,4-bis(benzyloxy)-6-(9-hydroxydecyl)-benzoate with sodium ethoxide according to the method of claim 6.

9. The method of claim 8 wherein the reactants are in high dilution.

10. A method for preparing (R,S)-zearalane dibenzyl ether comprising reacting ethyl 2,4-bis(benzyloxy)-6-(10-hydroxyundecyl)-benzoate with sodium ethoxide according to the method of claim 6.

11. The method of claim 10 wherein the reactants are in high dilution.

* * * * *

UNITED STATES PATENT OFFICE
CERTIFICATE OF CORRECTION

Patent No. 3,901,921  Dated August 26, 1975

Inventor(s) Wilbert Herbert Urry et al.  Page 1 of 4

It is certified that error appears in the above-identified patent and that said Letters Patent are hereby corrected as shown below:

In CHART II - Continued at columns 5 and 6, formula XIV should read

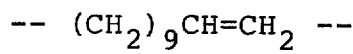
-- $(CH_2)_9CH=CH_2$ -- formula which represents the reaction product of the compound of formula XVII and benzyl chloride ($\phi CH_2Cl$) should read

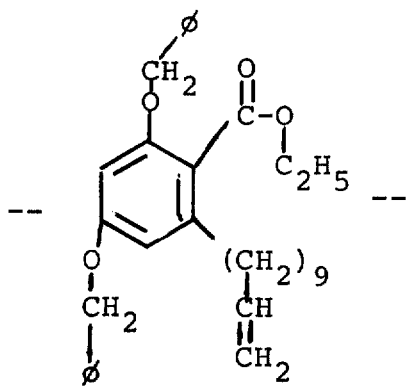

and the designation -- XVIII -- should appear thereunder.

Column 13, line 20, the expression in the parentheses should read

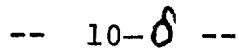
-- $10-\delta$ --

UNITED STATES PATENT OFFICE
CERTIFICATE OF CORRECTION

Patent No. 3,901,921　　　Dated August 26, 1975

Inventor(s) Wilbert Herbert Urry et al.　　　Page 2 of 4

It is certified that error appears in the above-identified patent and that said Letters Patent are hereby corrected as shown below:

Column 16, line 54, the expression in the first parentheses should read -- 3 m, 3, $C\underline{H}_2=C\underline{H}$ --

Column 17, formula V should read

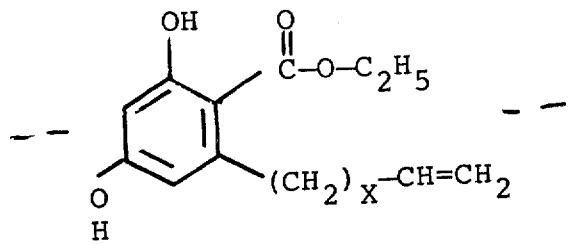

Column 18, formula VI should read

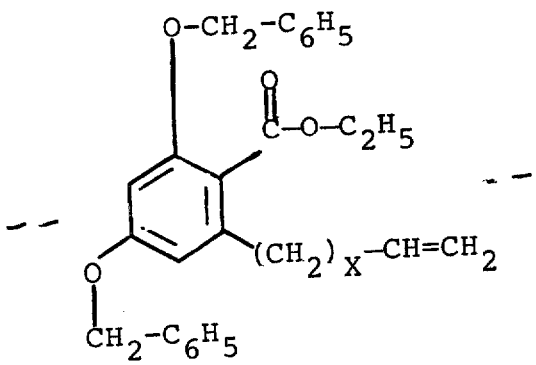

UNITED STATES PATENT OFFICE
CERTIFICATE OF CORRECTION

Patent No. 3,901,921      Dated August 26, 1975

Inventor(s) Wilbert Herbert Urry et al.      Page 3 of 4

It is certified that error appears in the above-identified patent and that said Letters Patent are hereby corrected as shown below:

Column 18, line 61, the expression in the first parentheses should read

-- q, 2, J = 7 Hz, COOC$\underline{H}_2$ --

Column 25, line 30, "C$\underline{H}_3$" should appear -- $\underline{C}H_3$ --.

Column 32, line 39, a hyphen should appear before "Hexenal".

Column 32, formula XXIII should appear --
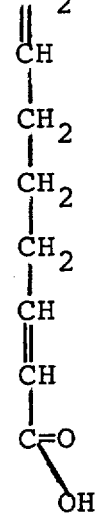
--

UNITED STATES PATENT OFFICE
CERTIFICATE OF CORRECTION

Patent No. 3,901,921  Dated August 26, 1975

Inventor(s) Wilbert Herbert Urry et al.  Page 4 of 4

It is certified that error appears in the above-identified patent and that said Letters Patent are hereby corrected as shown below:

Columns 33 and 34, the formula in the second row of formulae between lines 21 and 50 should appear

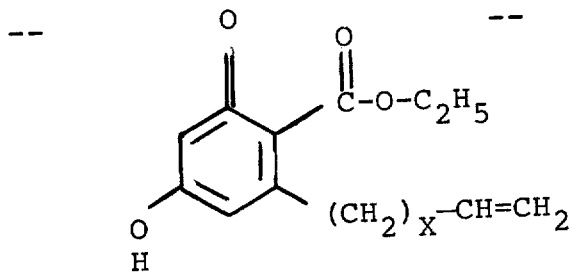

and the designation -- XXV A -- should appear thereunder.

Signed and Sealed this seventeenth Day of February 1976

[SEAL]

Attest:

RUTH C. MASON
Attesting Officer

C. MARSHALL DANN
Commissioner of Patents and Trademarks